(12) United States Patent
Sato et al.

(10) Patent No.: US 6,875,033 B2
(45) Date of Patent: Apr. 5, 2005

(54) CARD CONNECTOR

(75) Inventors: Shigeru Sato, Chiba (JP); Toshiyasu Ito, Togane (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 10/650,970

(22) Filed: Aug. 29, 2003

(65) Prior Publication Data

US 2004/0043664 A1 Mar. 4, 2004

(30) Foreign Application Priority Data

Sep. 2, 2002 (JP) ........................................ 2002-257115

(51) Int. Cl.$^7$ .............................................. H01R 13/62
(52) U.S. Cl. ...................................................... 439/159
(58) Field of Search ................................ 439/159, 152, 439/155

(56) References Cited

U.S. PATENT DOCUMENTS 6,113,403 A * 9/2000 Oguchi ........................ 439/159
6,332,790 B1 * 12/2001 Ishikawa et al. ............. 439/157
6,572,392 B2 * 6/2003 Motojima .................... 439/159

FOREIGN PATENT DOCUMENTS

JP          2001-143789         5/2001
JP          2001-143815         5/2001

* cited by examiner

*Primary Examiner*—Phuong Dinh
(74) *Attorney, Agent, or Firm*—Finnegan, Henderson, Farabow, Garrett & Dunner, LLP

(57) ABSTRACT

The card connector of the present invention is formed to have a hollow housing shape by combining two housing members with each other and an ejecting mechanism for ejecting a card, wherein the ejecting mechanism includes an ejecting member for ejecting the card and a spring member for elastically biasing the ejecting member, and a cam having a loop-like cam groove around the cam is provided on a lateral side of the ejecting member; one end of the a cam lever being held by one of the housing members and the other end of the cam lever being slidable along the cam groove formed around the cam. Thereby, the card connector can be to reduce a width thereof by providing a heart cam and to shorten a length of the ejecting member so that the card connector becomes small in size as a whole.

15 Claims, 29 Drawing Sheets

CARD CONNECTOR

This application claims priority from Japanese Patent Application No. 2002-257115 filed Sep. 2, 2002, which is incorporated hereinto by reference.

BACKGROUND OF THE INVENTION

1. Field of the Invention

The present invention relates to a card connector attached to an electronic instrument or an information terminal equipment such as a portable telephone, a home telephone, PDA (a personal digital assistance), a portable type audio set or a camera, particularly to a card connector capable of smoothly inserting or withdrawing a card such as an IC card or an SD card.

2. Description of the Related Art

Recently, in electronic instruments of information terminal equipment, such as portable telephones, home telephones, PDAs (personal digital assistants), portable audio devices, or cameras, the use of an IC card, a PC card, an SD card or a SIM card in which a CPU or an IC part called a memory IC chip is incorporated has widely prevailed. As a result, a card connector capable of receiving such a small-sized memory card as an IC card, a PC card, an SD card, or a SIM card has been required.

Also, in the conventional card connector of this a type, there has been a market requirement for reducing a height of the connector and minimizing a size thereof while maintaining a sufficient strength and durability to withstand the forces associated with inserting and withdrawing the card. Also, it has been required that the inserted card is easily ejectable from the card connector. To satisfy such requirements, a hollow connector housing has an upper housing member on the upper surface thereof as a cover member, which cover member is incorporated into a lower housing member made of an insulating material as a connector body as disclosed in Laid-Open Japanese Patent Application Nos. 2001-143815 and 2001-143789, to provide a card ejecting mechanism for easily ejecting a card.

In FIGS. 24 to 28 of the attached drawings, one example of the conventional card connector of such a type is illustrated as a prior art; that is, there are the entirety of the card connector and the lower housing member as the connector body from which the cover member is removed to show the ejecting mechanism and a plurality of contacts. FIG. 24 is a perspective view of an appearance of the conventional card connector in a prior art, FIG. 25 is a perspective view of the conventional card connector of FIG. 24, from which the upper housing member which is the cover member is removed, FIG. 26 is a bottom perspective view of the lower housing member shown in FIG. 25 as seen from the lower side, FIG. 27 is an enlarged bottom perspective view of part of the lower housing member of FIG. 26, and FIG. 28 is a bottom perspective view of an ejecting member.

As illustrated, the conventional card connector 100 includes a lower housing member 102 as a connector body, an upper housing member 103 which is a cover member for forming a hollow housing structure in combination with the lower housing member 102, an ejecting mechanism 104 for ejecting a card, and a plurality of contacts 105 electrically connected to the card.

In this conventional card connector 100, the lower housing member 102 as the connector body is molded with an insulating material such as a suitable synthetic resinous material, and combined with the upper housing member 103 as the cover member made of a metallic sheet material to form a hollow flat housing for accommodating the inserted card. The ejecting mechanism 104 is provided along one side of the lower housing member 102 made of the insulating material to smoothly withdrawing the card from the card connector 100, and the plurality of contacts 105 are provided to be connected to pad sections arranged at a tip end of the card inserted into the card connector 100.

The ejecting mechanism 104 in the conventional card connector 100 includes, for example, an ejecting member 106 as a slider mounted to be slidable along one edge of the lower housing member 102, a spring member 107 such as a coil spring for elastically biasing this ejecting member 106, and a pushing member 108 formed integral with the ejecting member 106 for pushing the card outside from the card connector 100, to elastically push the ejecting member 106 due to the elastic pushing force of the spring member 107 and eject the card outside via the pushing member 108. The pushing member 108 extends generally in the right angle direction relative to the operating direction of the ejecting member 106, and is adapted to be brought into contact with the tip end of the card and operable via the ejecting member 106.

However, when the conventional card connector 100 is used, while the card such as an IC card, a PC card, an SD card, or a SIM card is inserted therein, the spring member 107 of the compressive type such as a coil spring is compressed by the ejecting member 106 provided integral with the pushing member 108. The card is pushed by the bias of the spring member 107 when the card is ejected, because one end of the spring member 107 is engaged with an engagement section 109 of the lower housing member 102, while the other end thereof is engaged with the ejecting member 106.

Accordingly, in the conventional card connector of this type, since the spring member 107 is engaged at one end to the engagement member 109 of the lower housing member 102 of the insulating material and at the other end to the ejecting member 106, a length of the ejecting member 106 becomes longer, and a total length of the card connector 100 becomes longer as a whole, resulting in a problem in that the card connector is difficult to be minimized in size as a whole.

SUMMARY OF THE INVENTION

An object of the present invention is to solve the above-mentioned problems in the prior art and provide a card connector small in size as a whole by providing a heart cam for ejecting a card in a side wall of an ejecting member to reduce a width of the card connector as well as making the ejecting member short to shorten a total length of the card connector.

To achieve the above-mentioned object, the card connector of the present invention has a hollow housing shape formed by combining two housing members with each other and an ejecting mechanism for ejecting a card, wherein the ejecting mechanism comprises an ejecting member for ejecting the card and a spring member for elastically biasing the ejecting member, and a cam having a loop-like cam groove around the cam, is provided in a side wall of the ejecting member; one end of a cam lever being held by one of the housing members and the other end of the cam lever being slidable along the cam groove formed around the cam. Thereby, it is possible to reduce a width of the card connector and reduce the length of the ejecting mechanism to shorten the entirety of the card connector. Thus, it is possible to minimize the size of the card connector as a whole.

The above and other objects, effects, features and advantages of the present invention will become more apparent from the following description of embodiments thereof taken in conjunction with the accompanying drawings.

DETAILED DESCRIPTION OF PREFERRED EMBODIMENTS (Embodiments)

Figure 1:
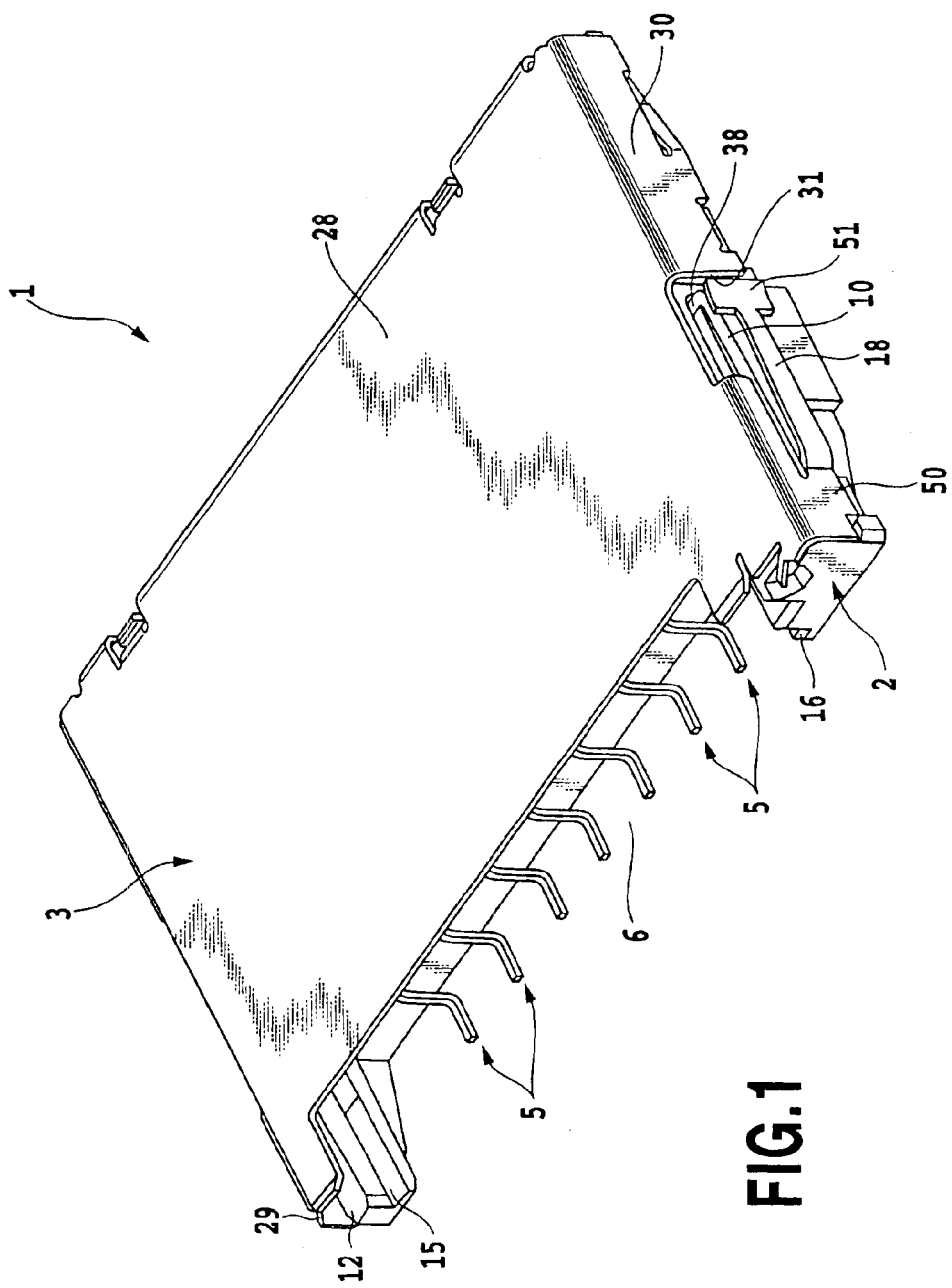
FIG. 1 is a perspective view of the card connector of the present invention as a whole.

FIGS. 1 to 23 illustrate one embodiment of the card connector of the present invention, wherein FIG. 1 is a perspective view of the card connector of the present invention as a whole.

Figure 2:
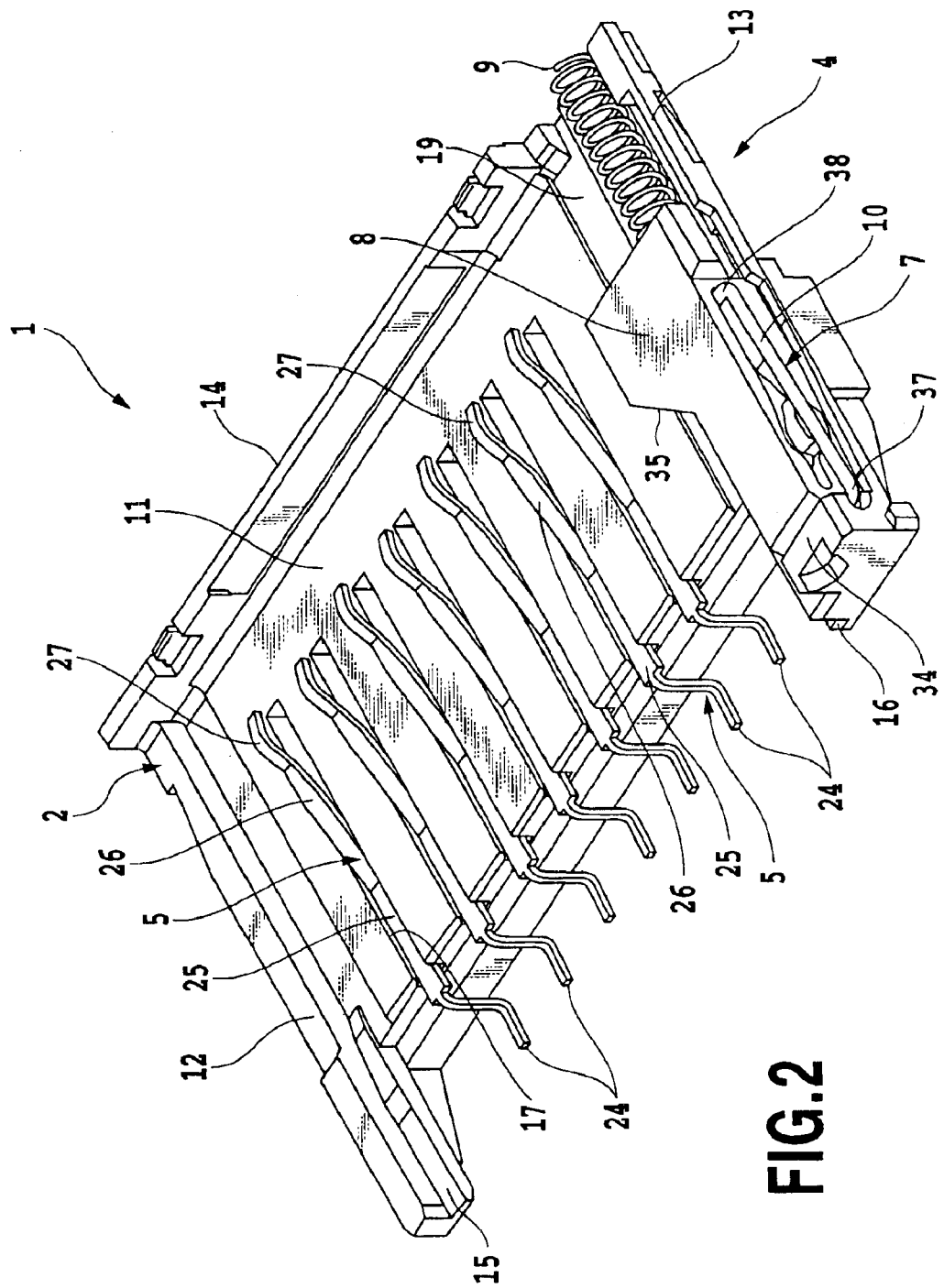
FIG. 2 is a perspective view of the card connector of the present invention shown in FIG. 1, from which an upper housing member is removed.
Figure 3:
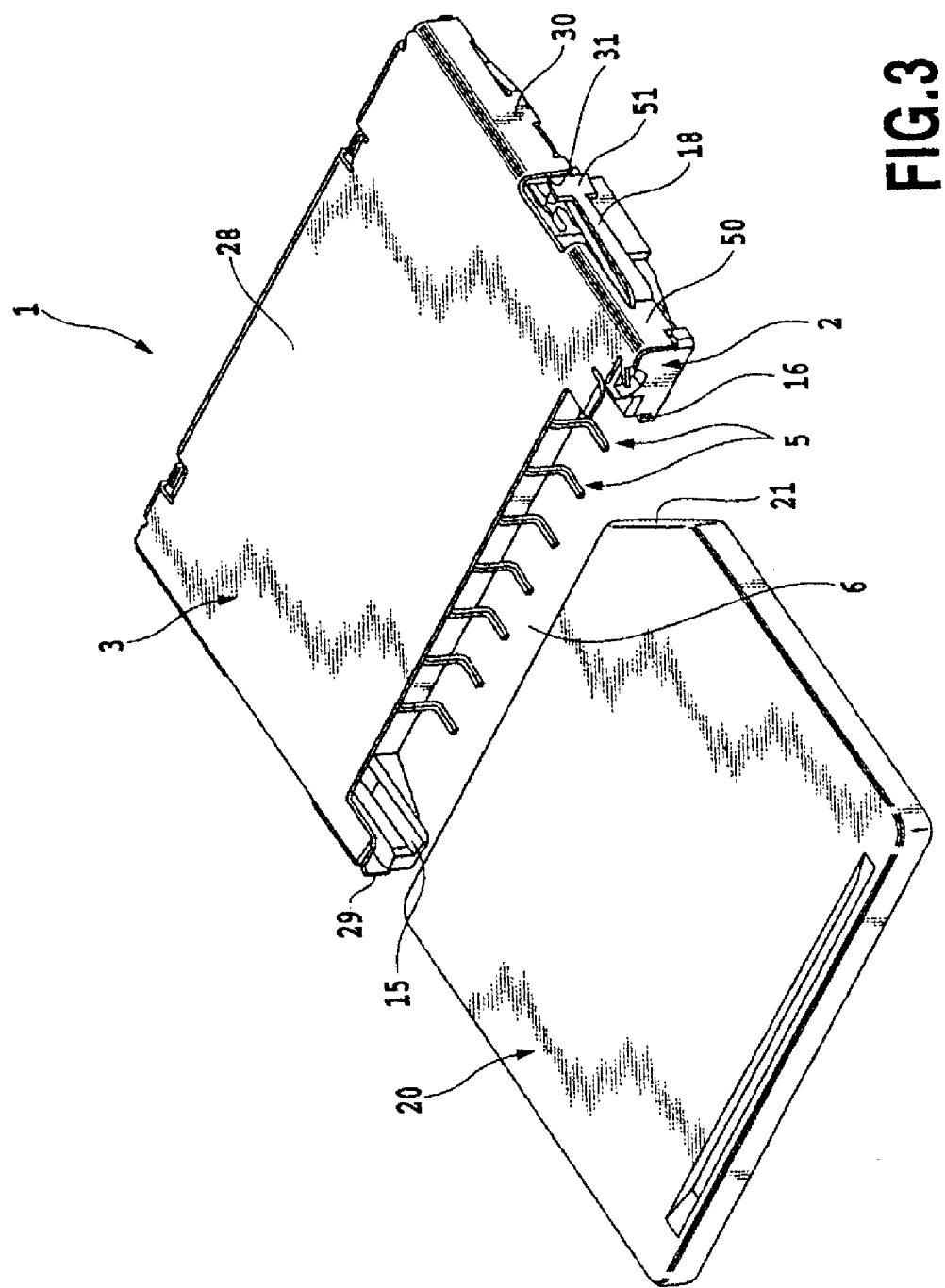
FIG. 3 is a perspective view when a card is being inserted into the card connector of the present invention shown in FIG. 1.
Figure 4:
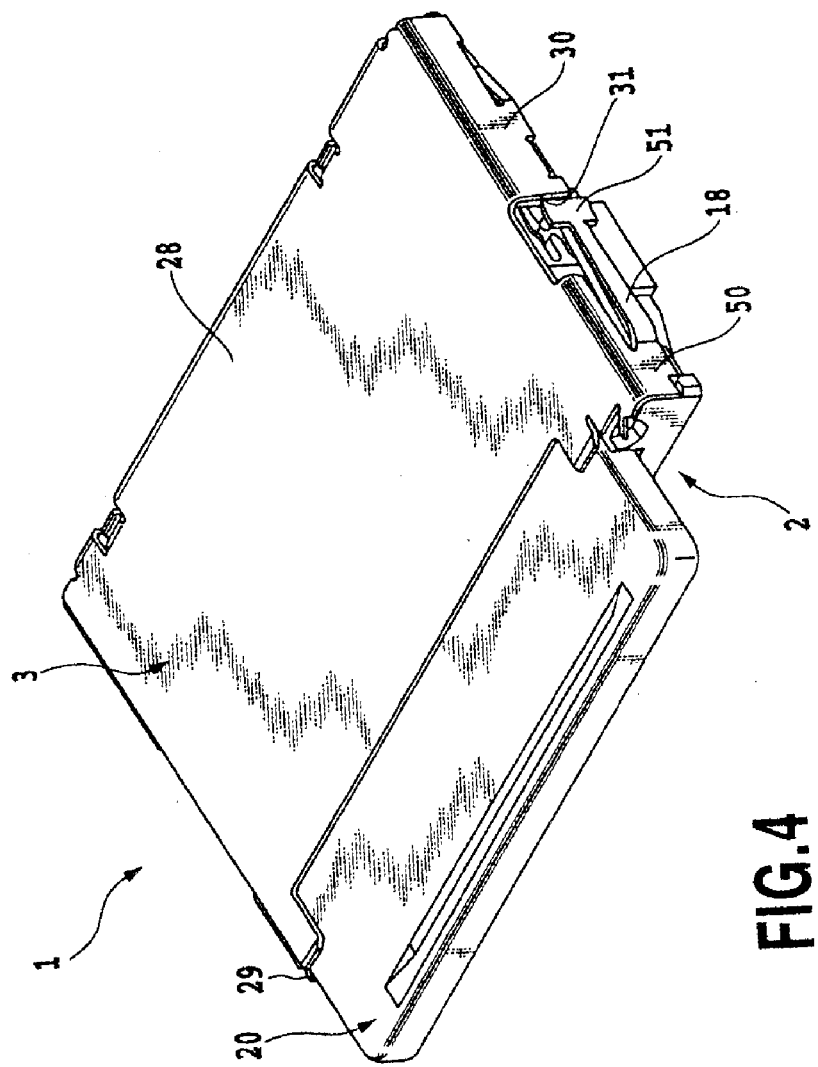
FIG. 4 is a perspective view when the card has been inserted into the card connector of the present invention shown in FIG. 3.
Figure 5:
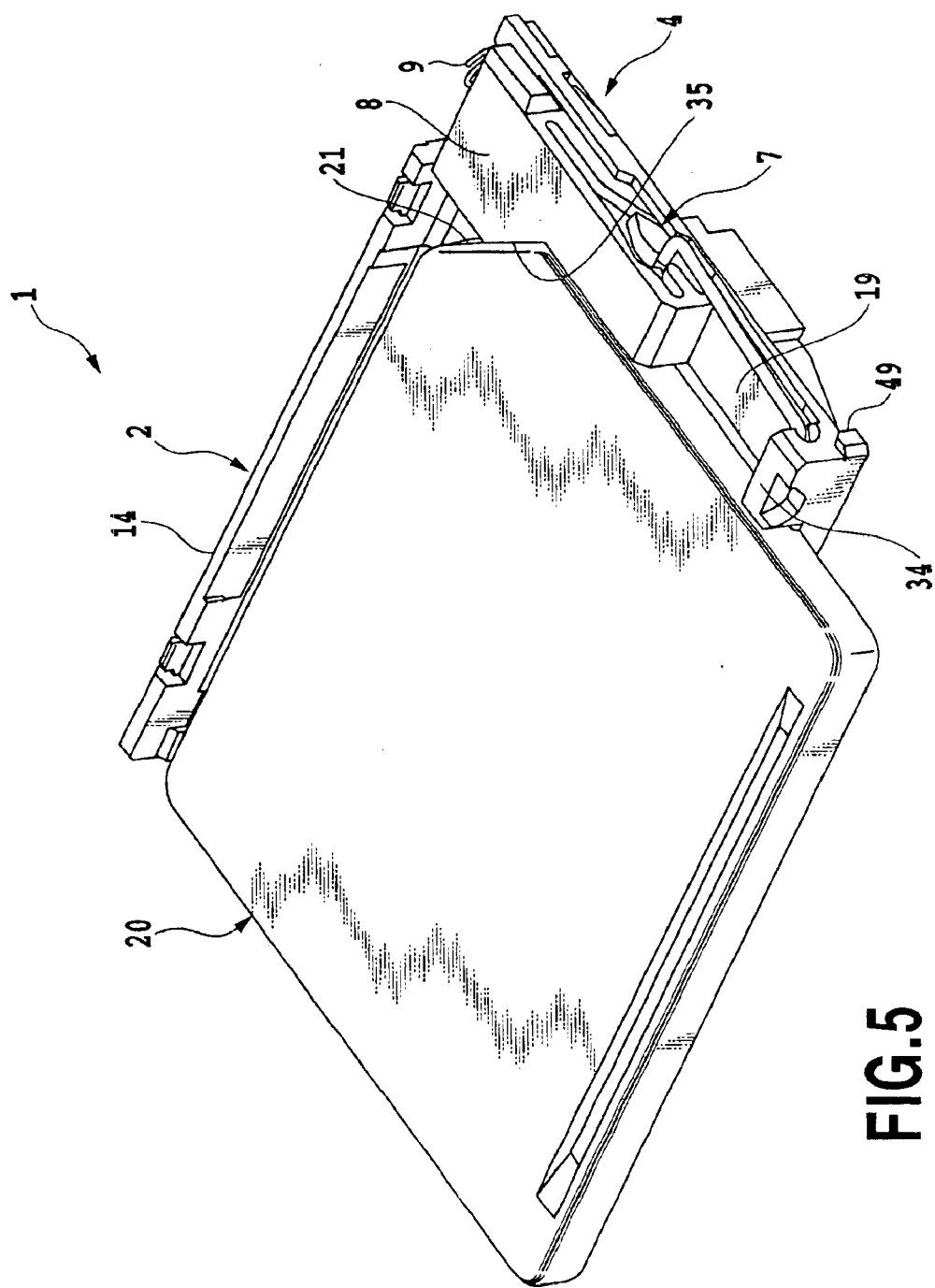
FIG. 5 is a perspective view of the card connector of the present invention shown in FIG. 4, from which the upper housing member is removed.
Figure 6:
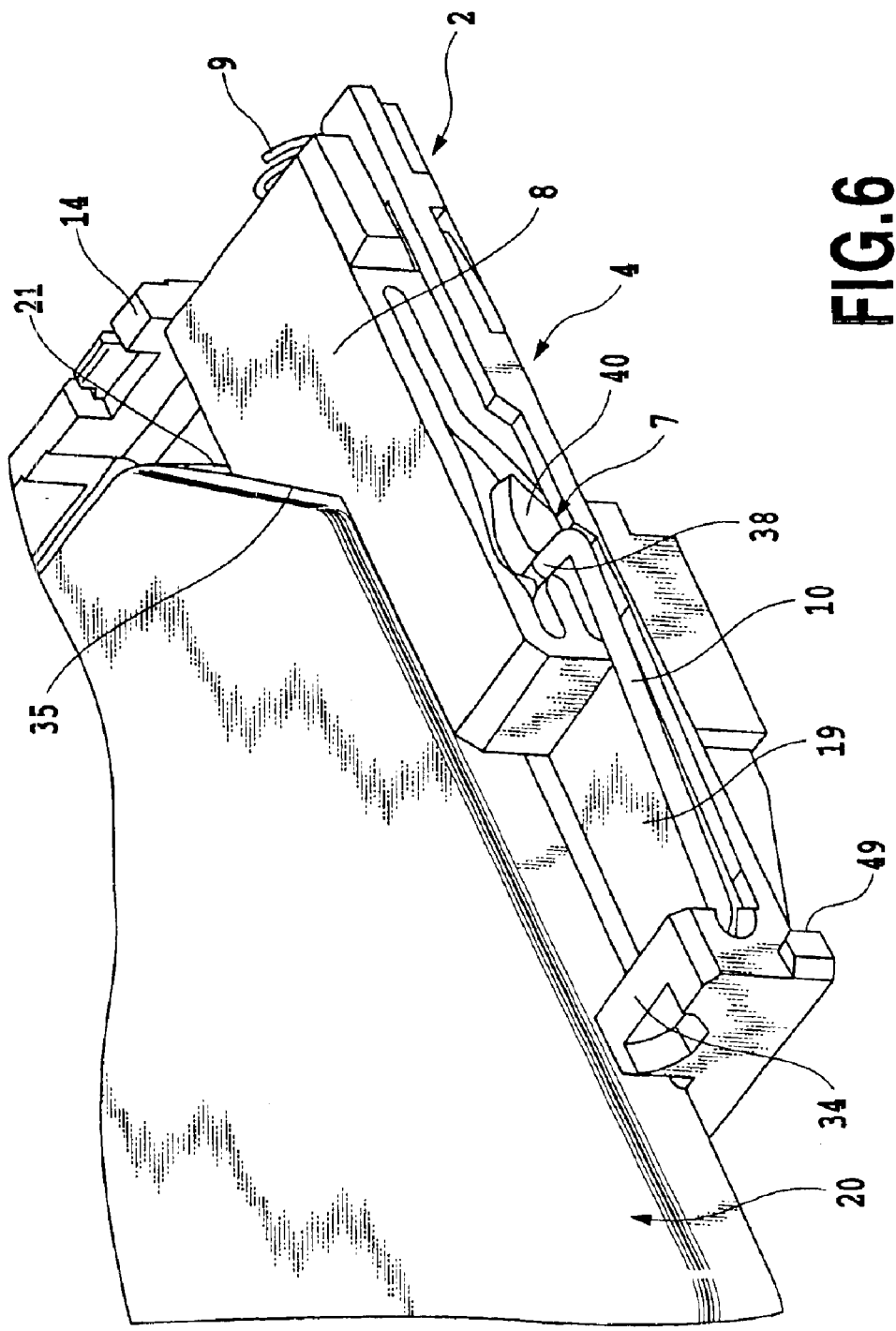
FIG. 6 is an enlarged partial perspective view of the ejecting member in the ejecting mechanism shown in FIG. 5.
Figure 7:
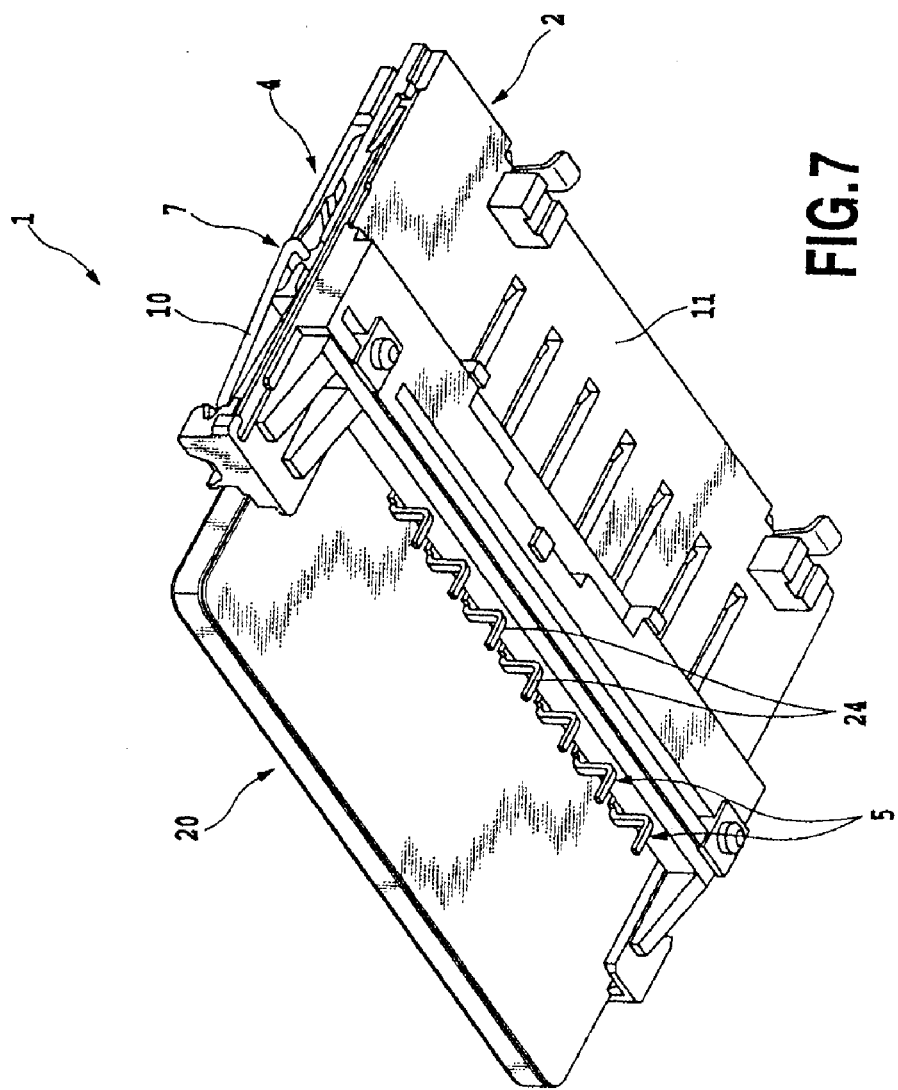
FIG. 7 is a perspective view of a bottom section of the card connector of the present invention.
Figure 8:
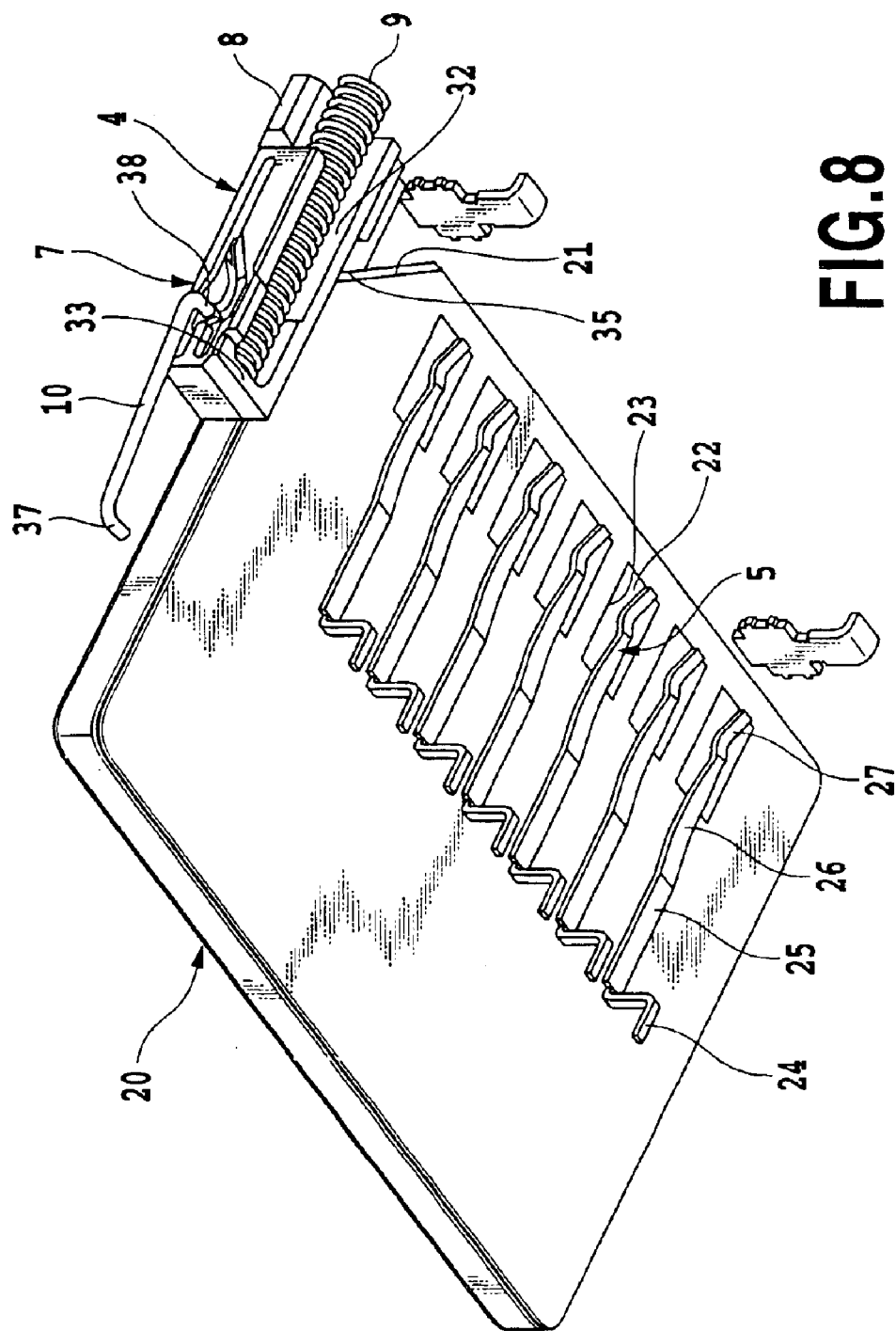
FIG. 8 is a bottom perspective view of the inventive card connector when the lower housing member is removed.
Figure 9:
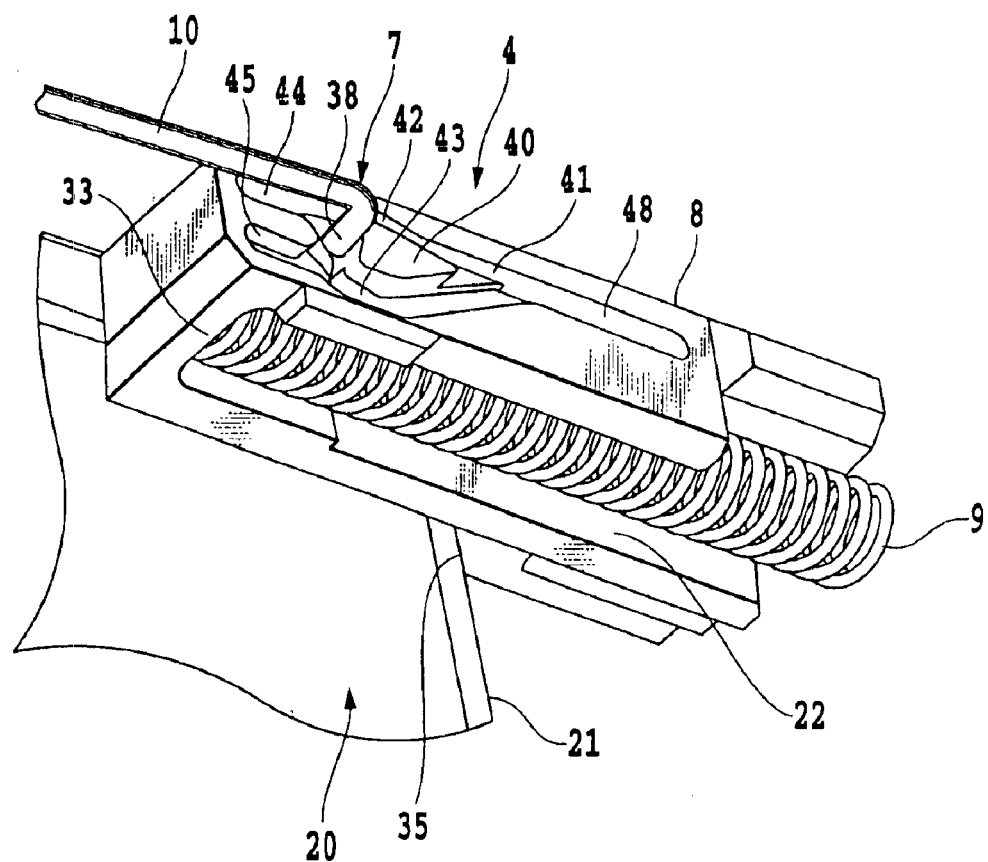
FIG. 9 is an enlarged partial view of the ejecting member and the spring member in the locked state shown in FIG. 8.
Figure 10:
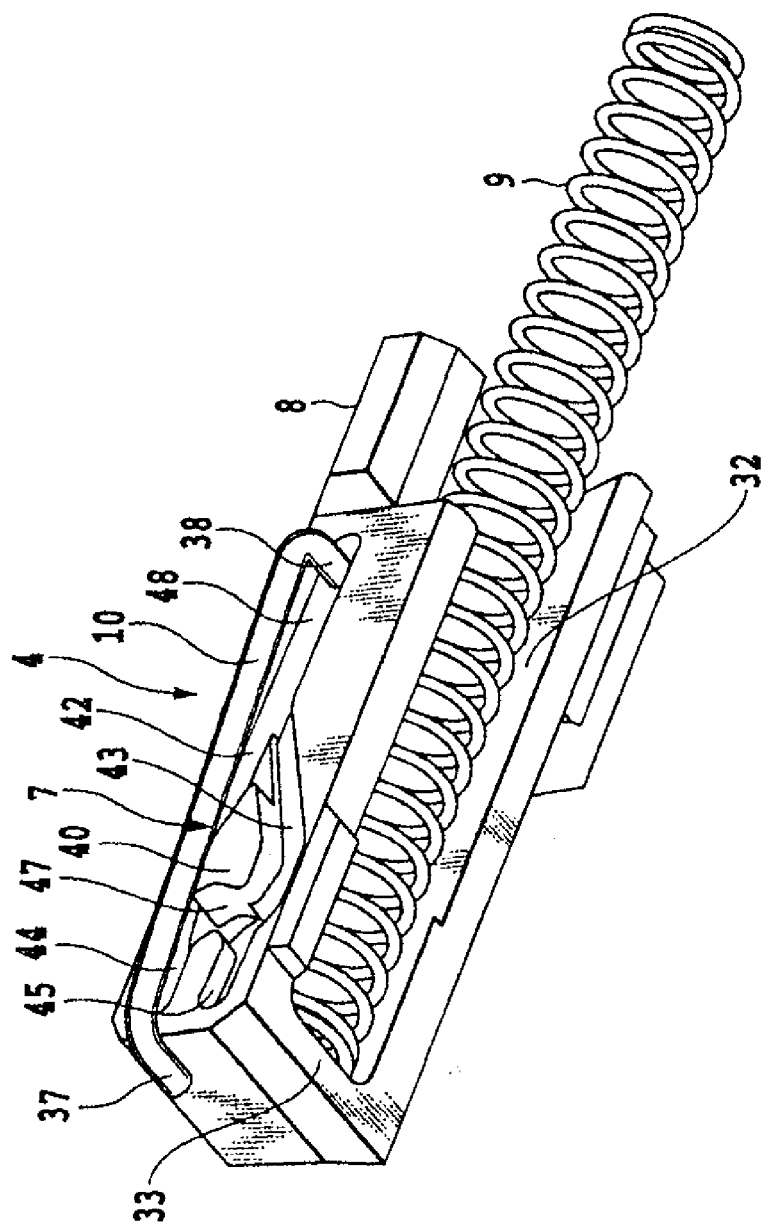
FIG. 10 is a similar enlarged partial view in the ejected state.

FIG. 2 is a perspective view of the card connector of the present invention shown in FIG. 1, from which an upper housing member is removed; FIG. 3 is a perspective view when a card is being inserted into the card connector of the present invention shown in FIG. 1; FIG. 4 is a perspective view when the card has been inserted into the card connector of the present invention shown in FIG. 3; FIG. 5 is a perspective view of the card connector of the present invention shown in FIG. 4, from which the upper housing member is removed; FIG. 6 is an enlarged partial perspective view of the ejecting member in the ejecting mechanism shown in FIG. 5; FIG. 7 is a perspective view of a bottom section of the card connector of the present invention; FIG. 8 is a bottom perspective view of the card connector of the present invention when the lower housing member is removed; FIG. 9 is an enlarged partial view of the ejecting member and the spring member in the locked state shown in FIG. 8; and FIG. 10 is a similar enlarged partial view in the ejected state.

Figure 11:
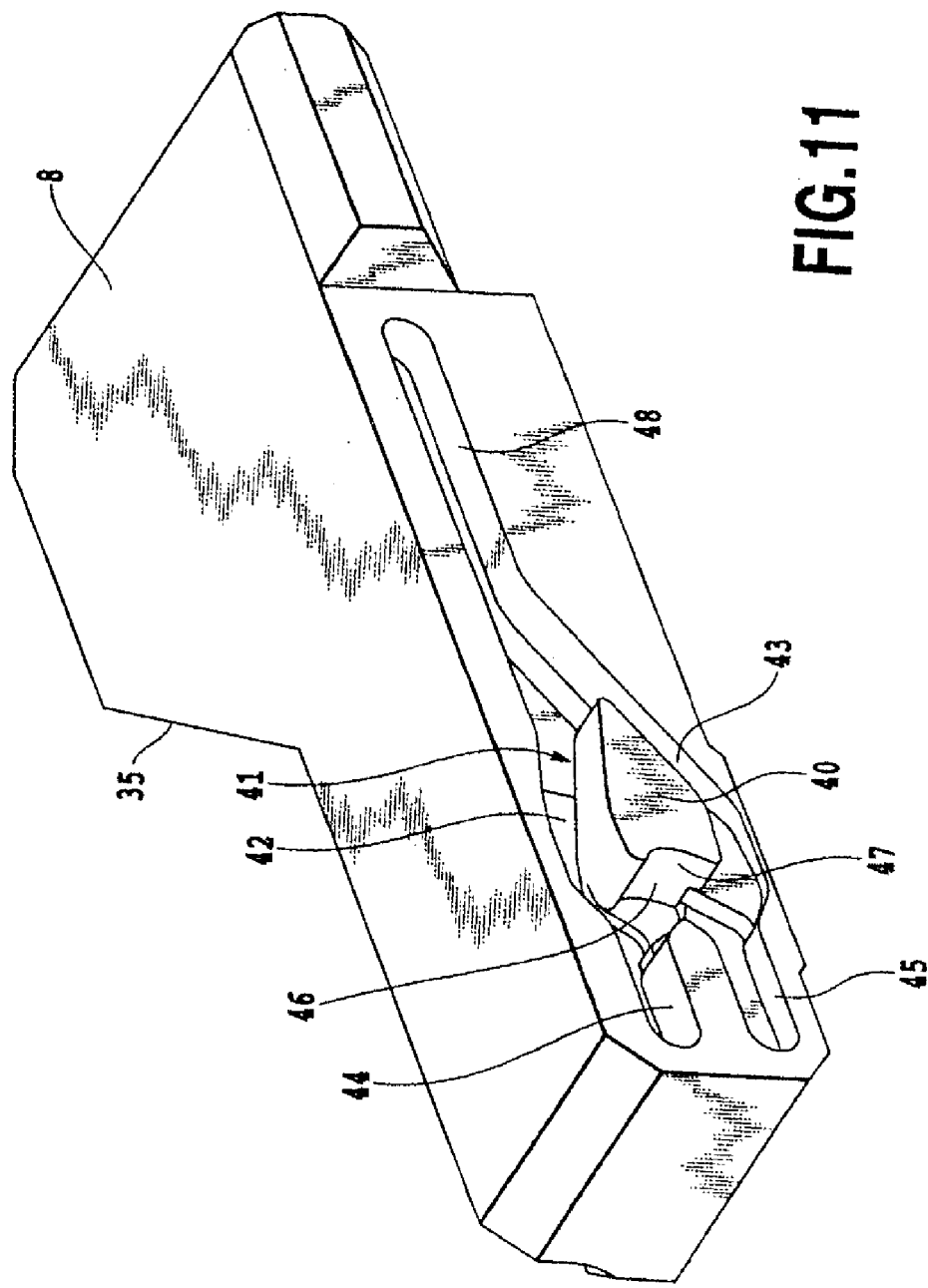
FIG. 11 is a perspective view of an appearance of the ejecting member in the card connector of the present invention.
Figure 12:
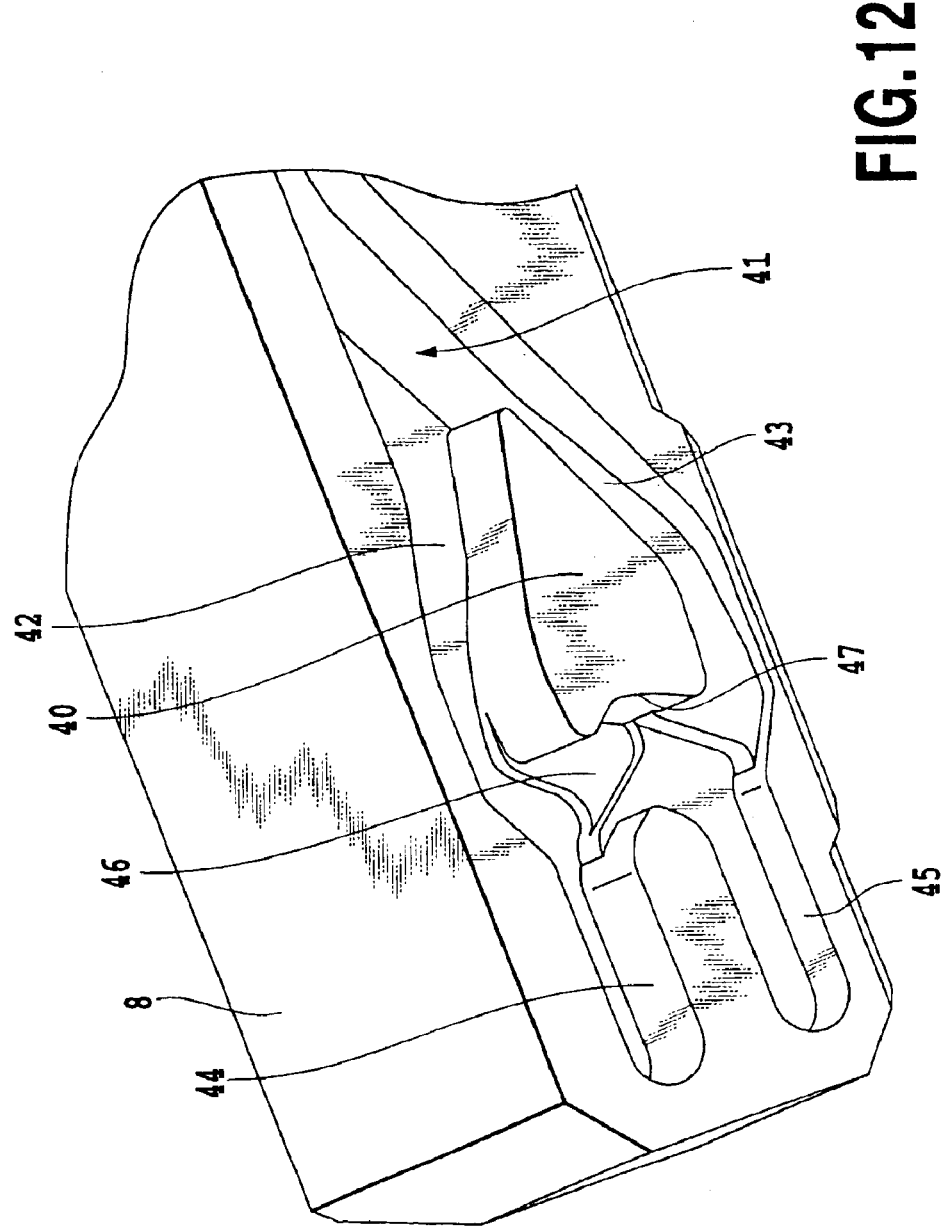
FIG. 12 is an enlarged partial view of a heart cam section of the ejecting member shown in FIG. 11.
Figure 13:
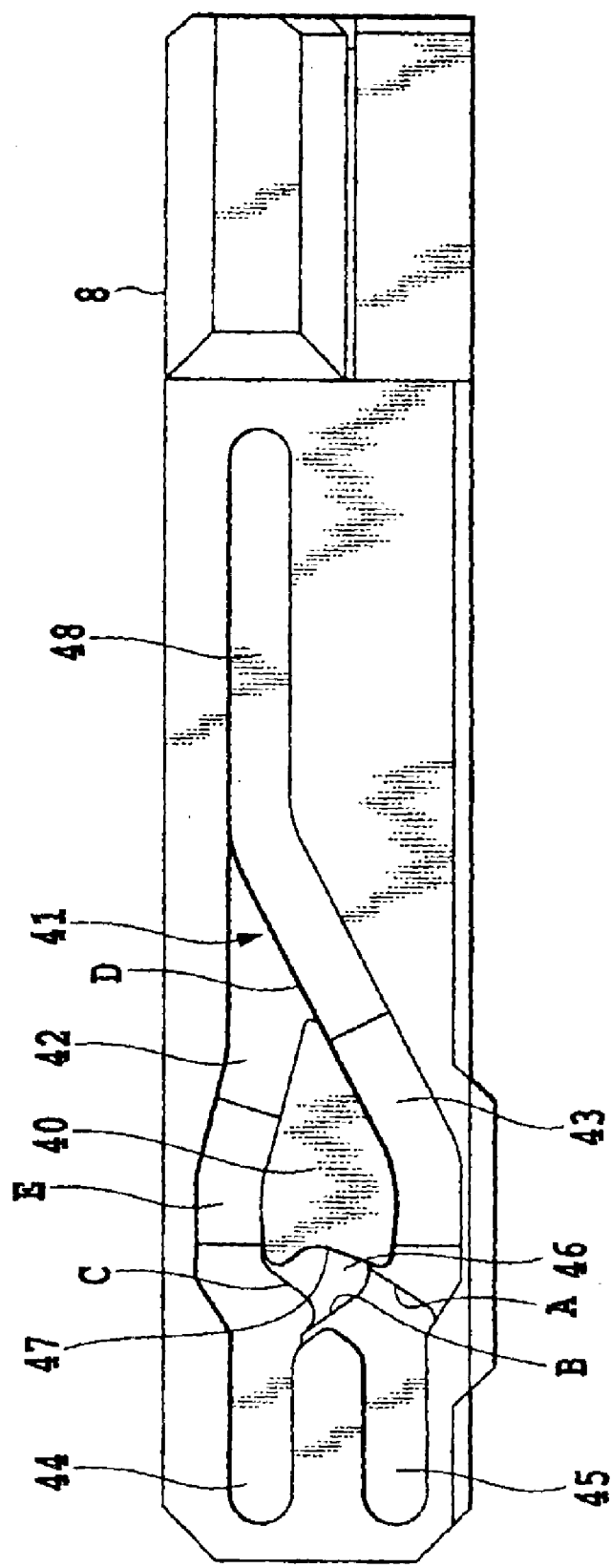
FIG. 13 is a side view of the heart cam of the ejecting member shown in FIG. 11.
Figure 14:
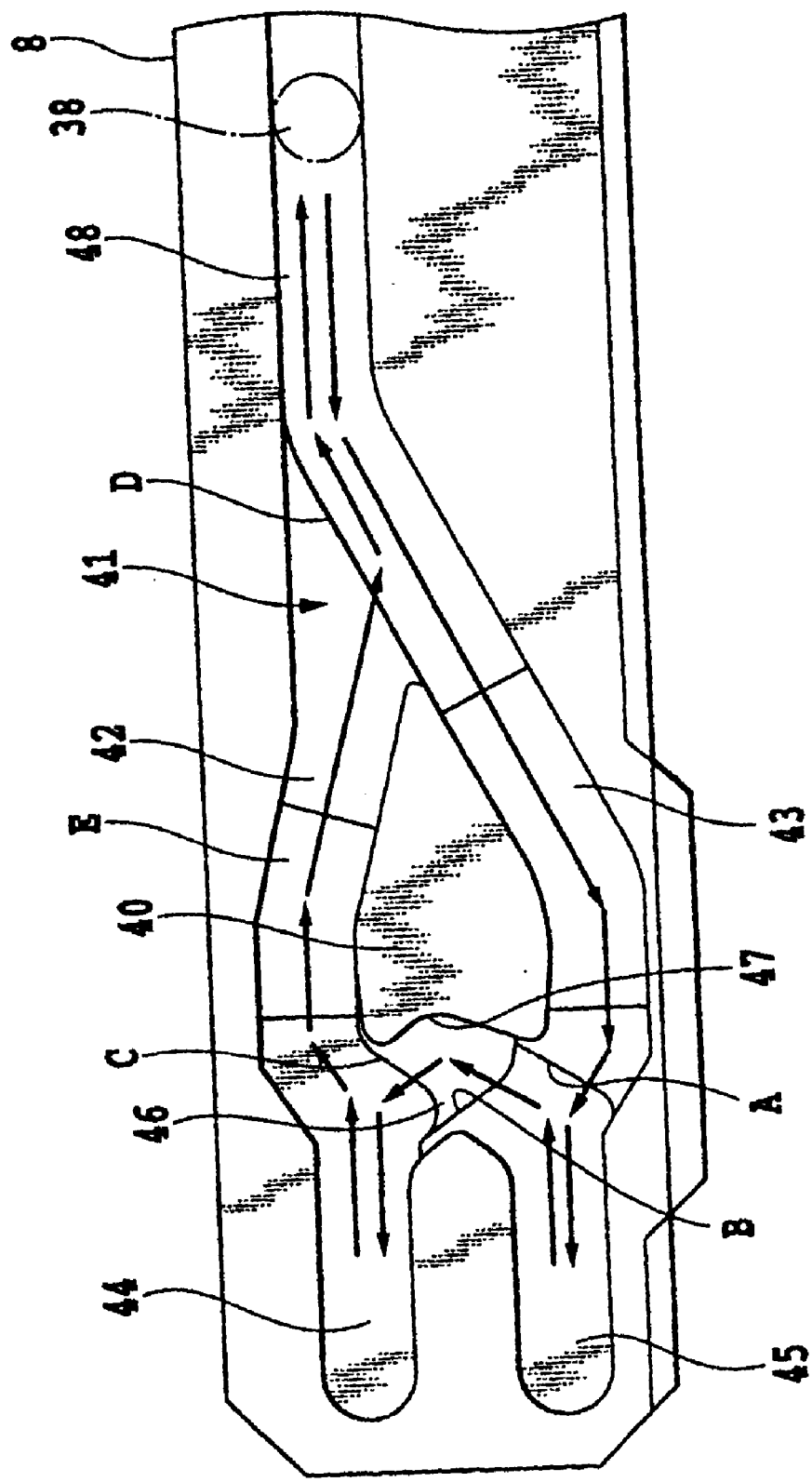
FIG. 14 is a side view of the ejecting member illustrating the steps of the operation of an end of the cam lever in the heart cam shown in FIG. 11.
Figure 15:
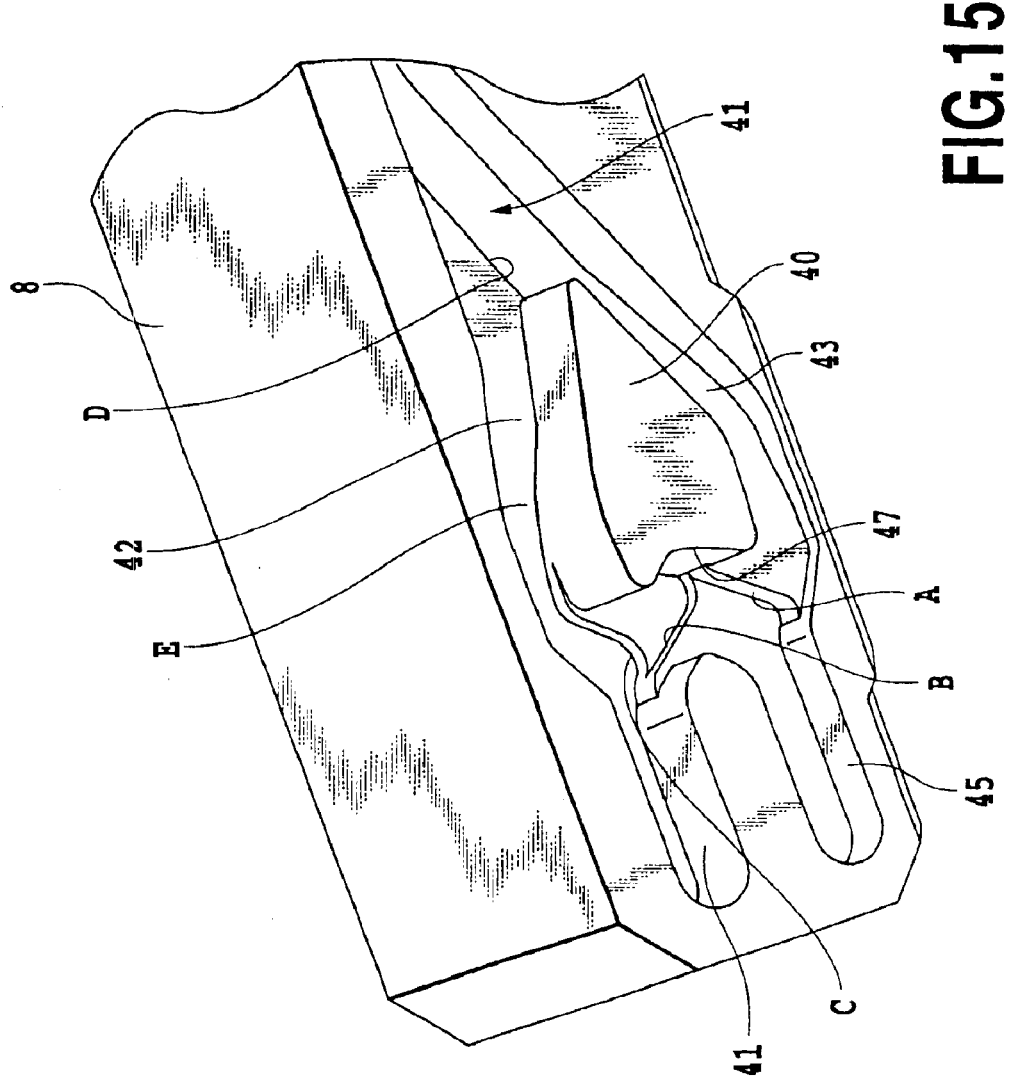
FIG. 15 is an enlarged partial view showing shoulders in the heart cam in FIG. 14.
Figure 16:
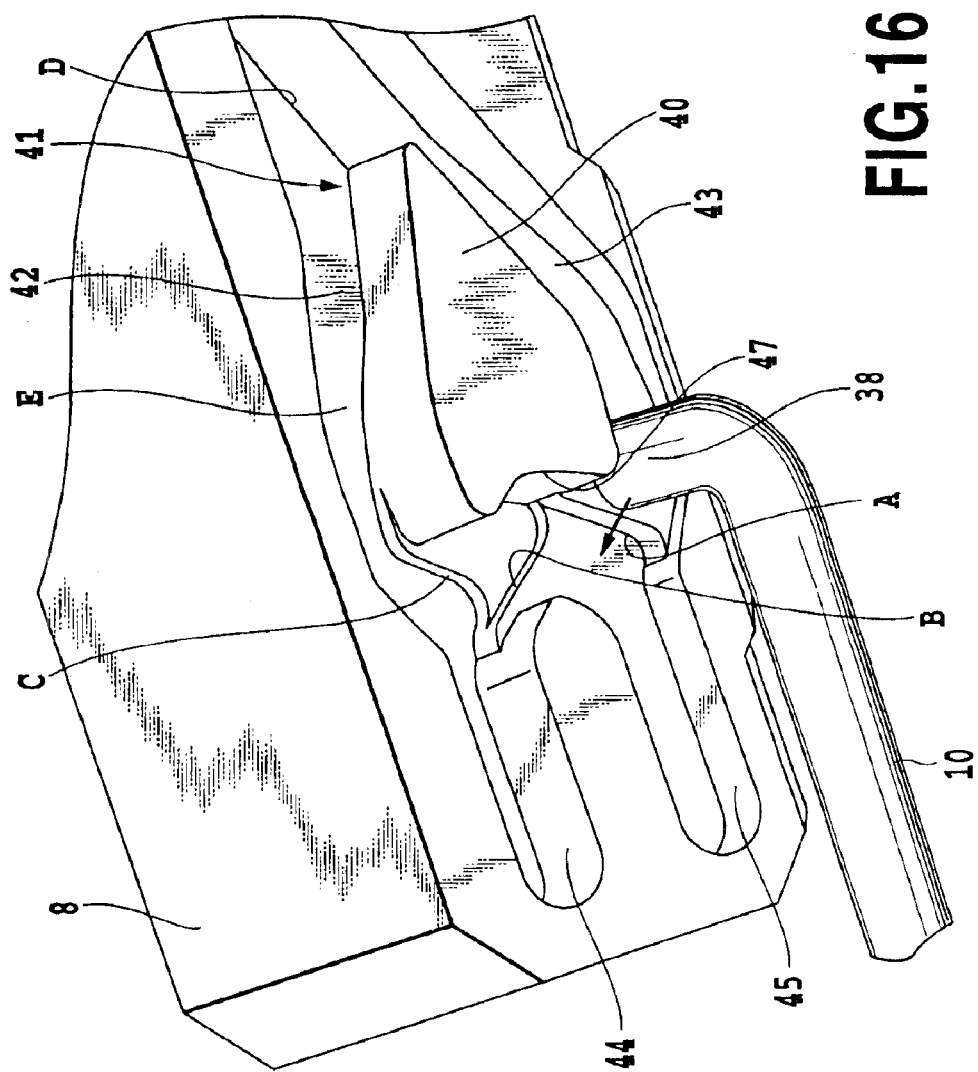
FIG. 16 is an enlarged partial view showing the movement in a first shoulder.
Figure 17:
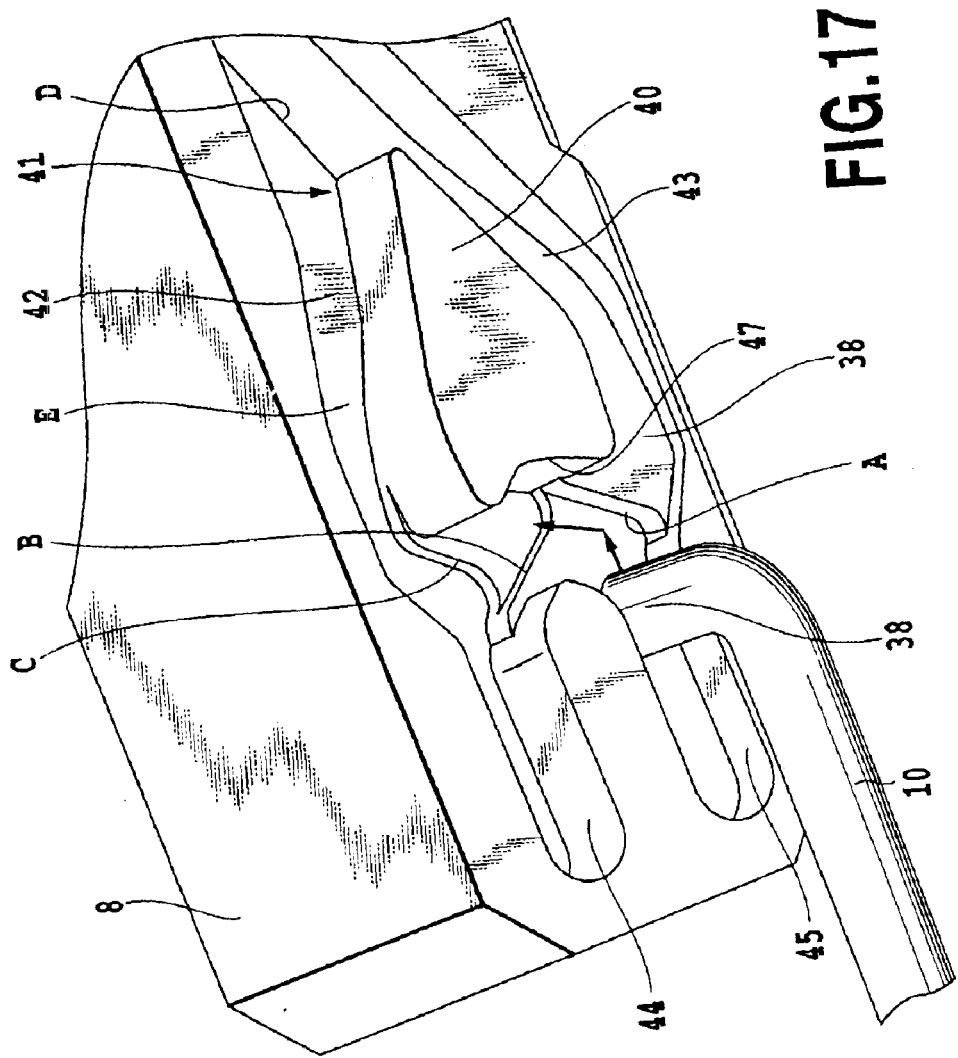
FIG. 17 is a similar enlarged partial view showing the movement in a second shoulder.
Figure 18:
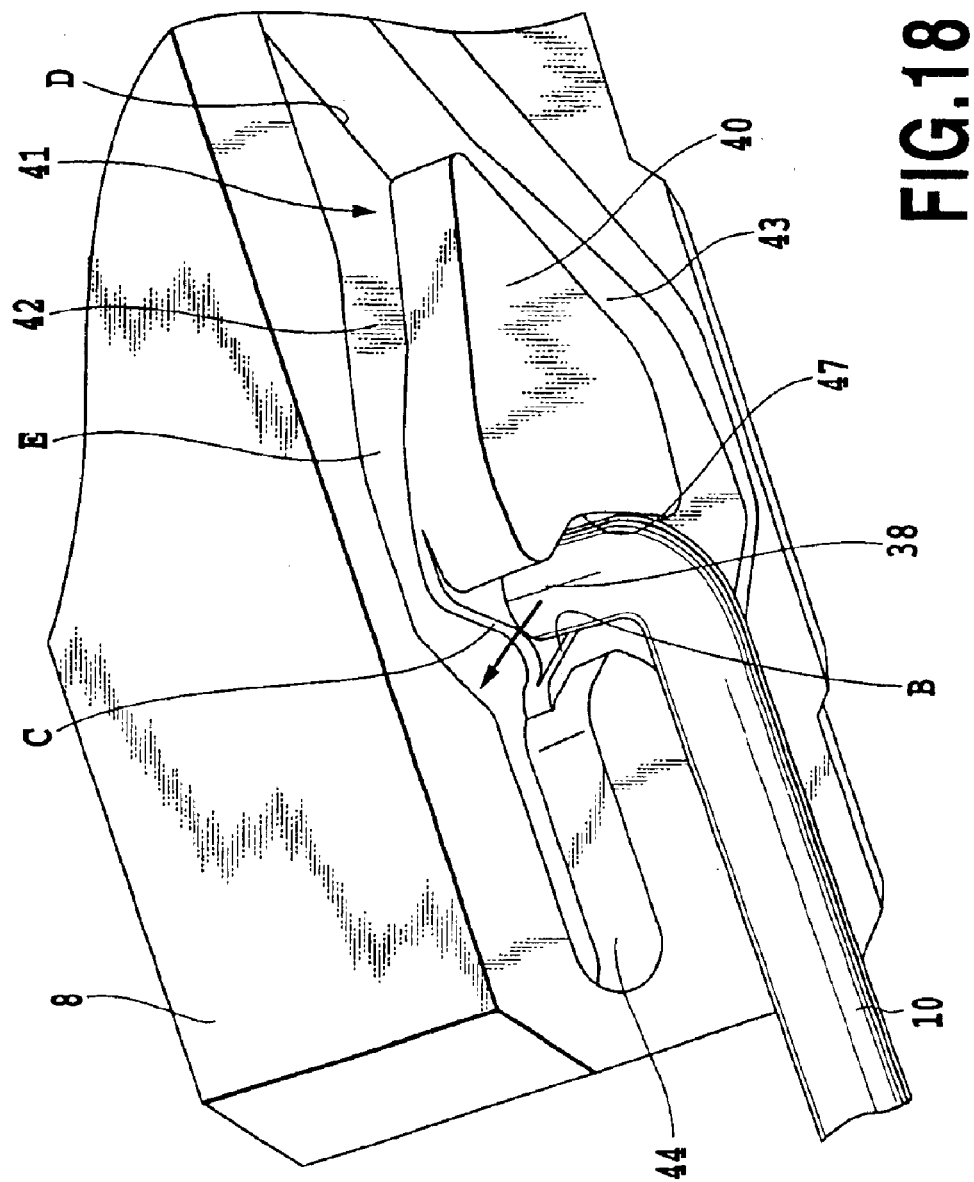
FIG. 18 is a similar enlarged partial view showing the movement in a third shoulder.
Figure 19:
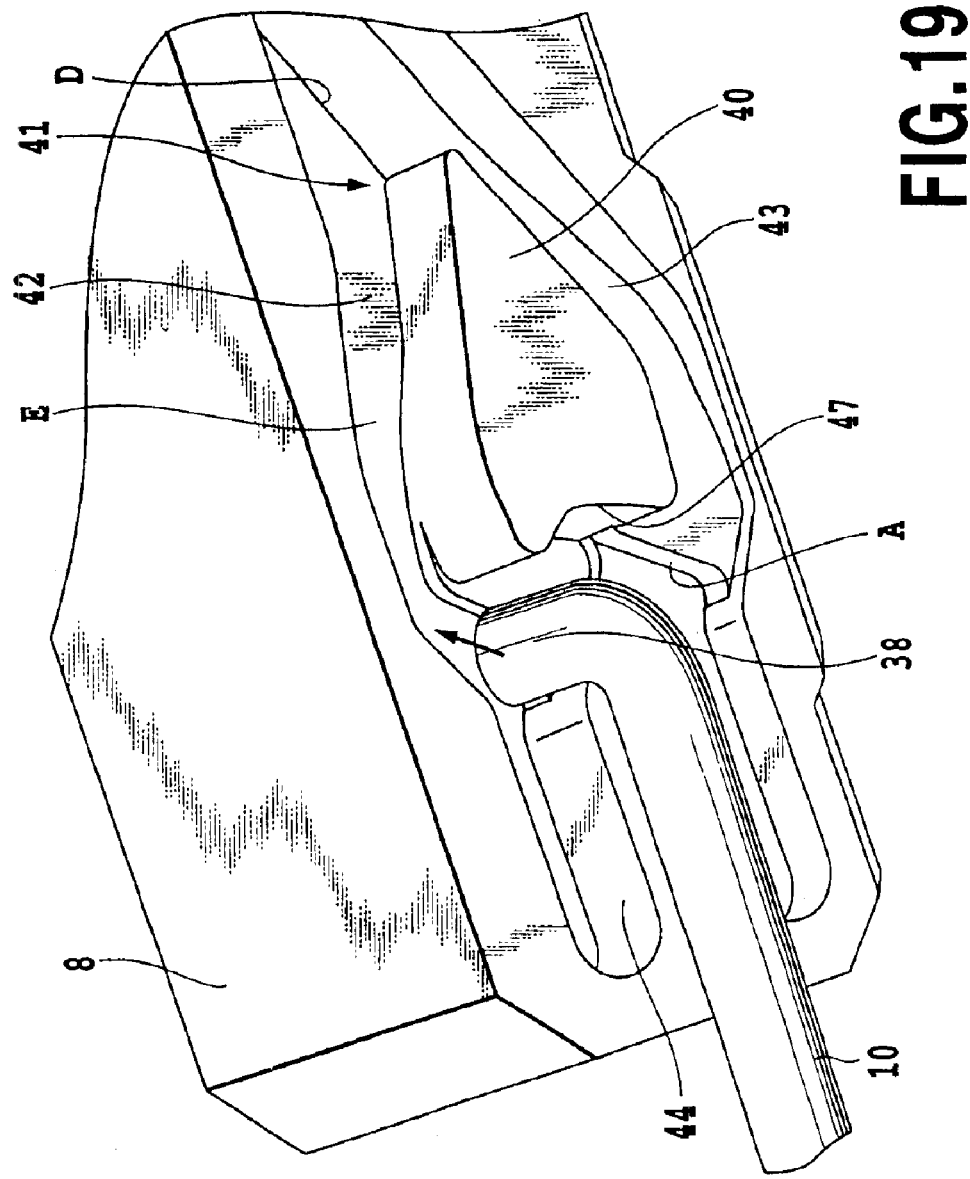
FIG. 19 is an enlarged partial view showing the movement on a surface of the third shoulder.
Figure 20:
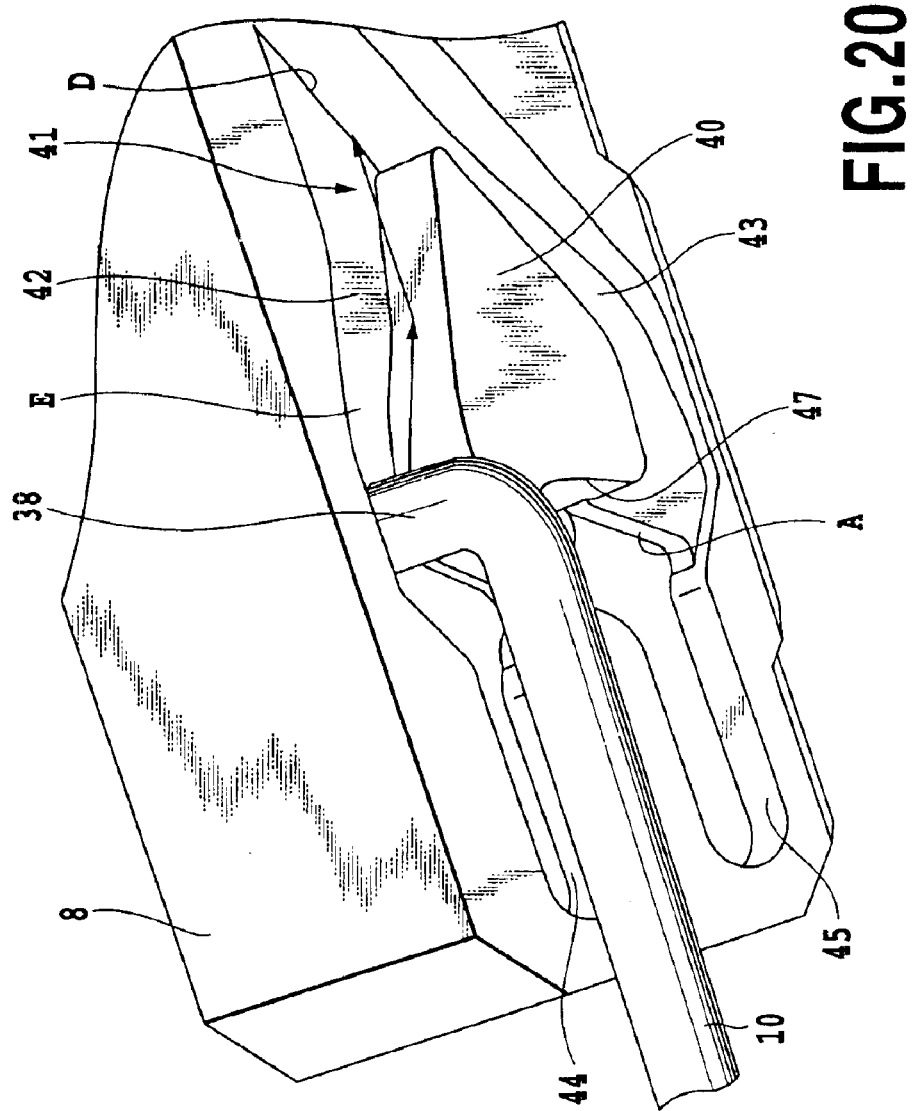
FIG. 20 is an enlarged partial view showing the movement when ascending an inclined surface.
Figure 21:
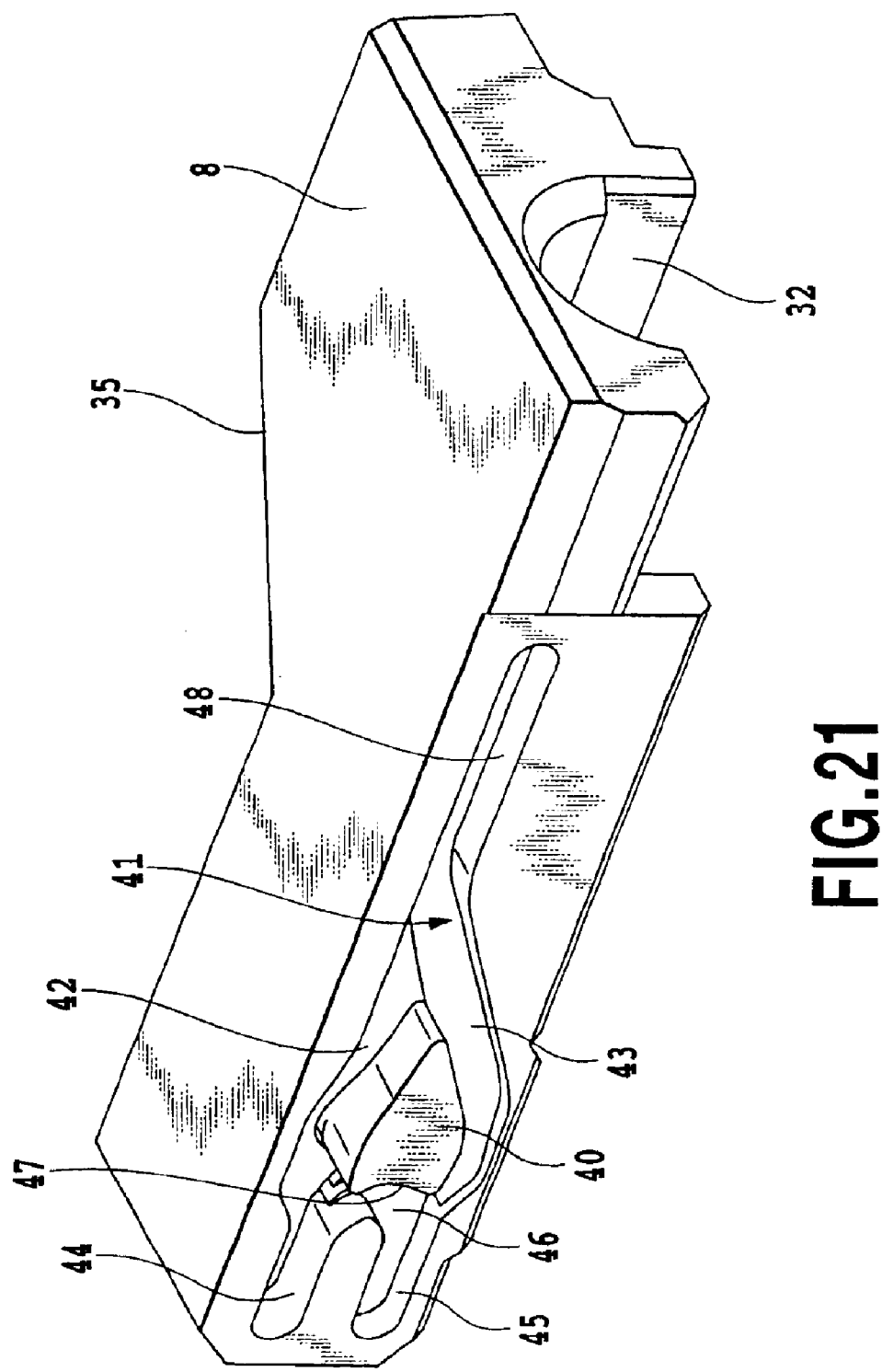
FIG. 21 is a perspective view of the ejecting member.
Figure 22:
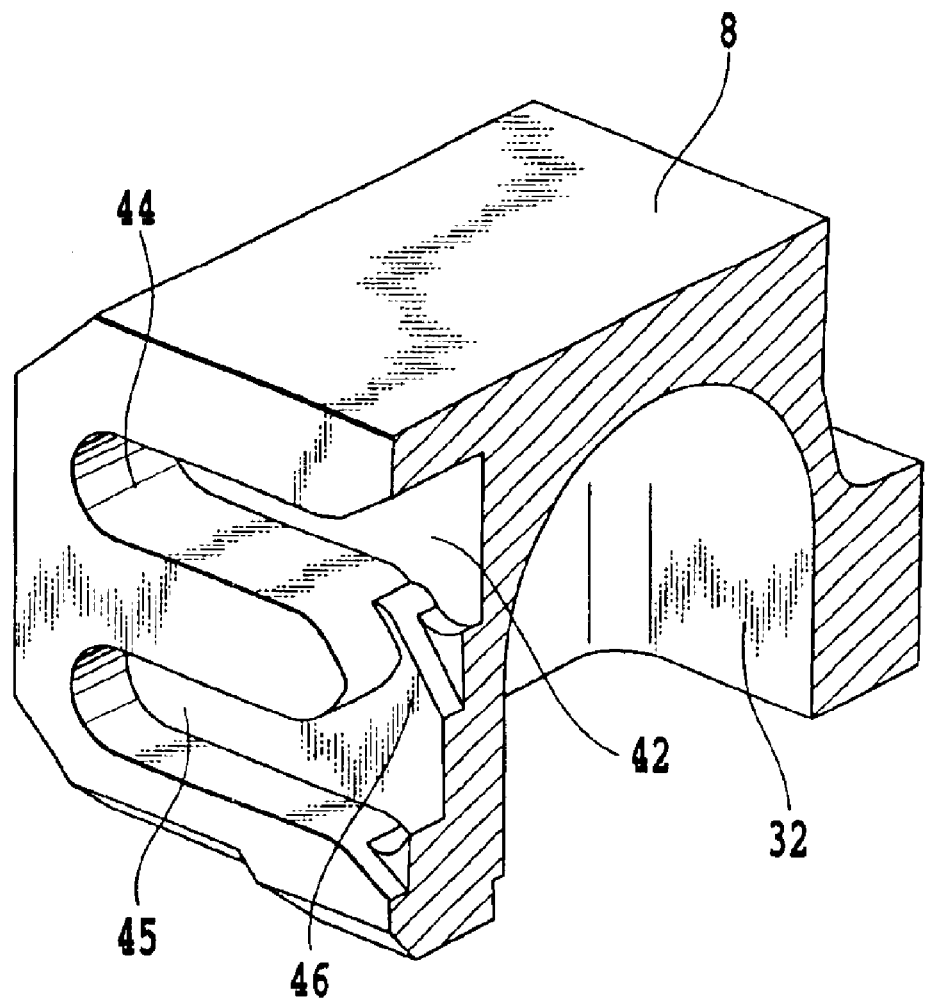
FIG. 22 is a partial perspective view of a cross-section of the heart cam section of the ejecting member.
Figure 23:
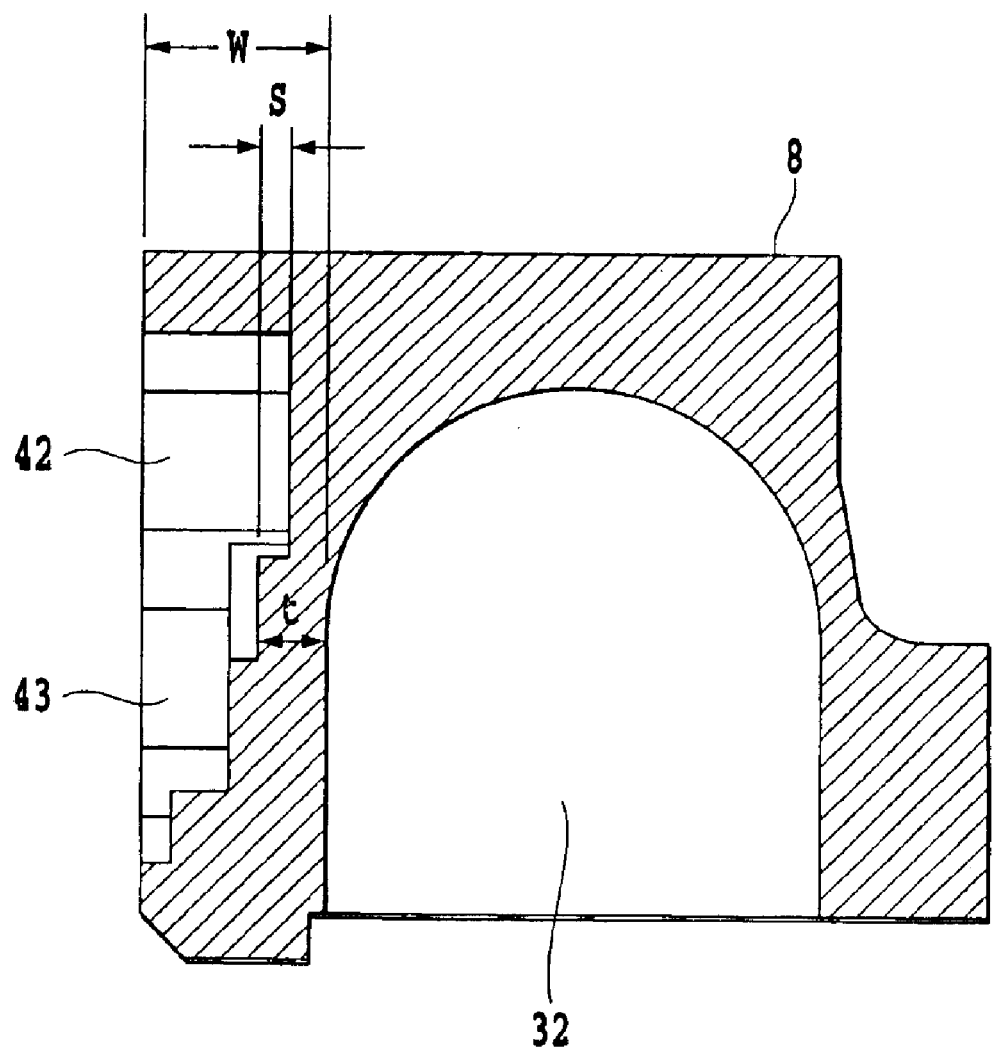
FIG. 23 is a side cross-sectional view of the heart cam section of the ejecting member.
Figure 24:
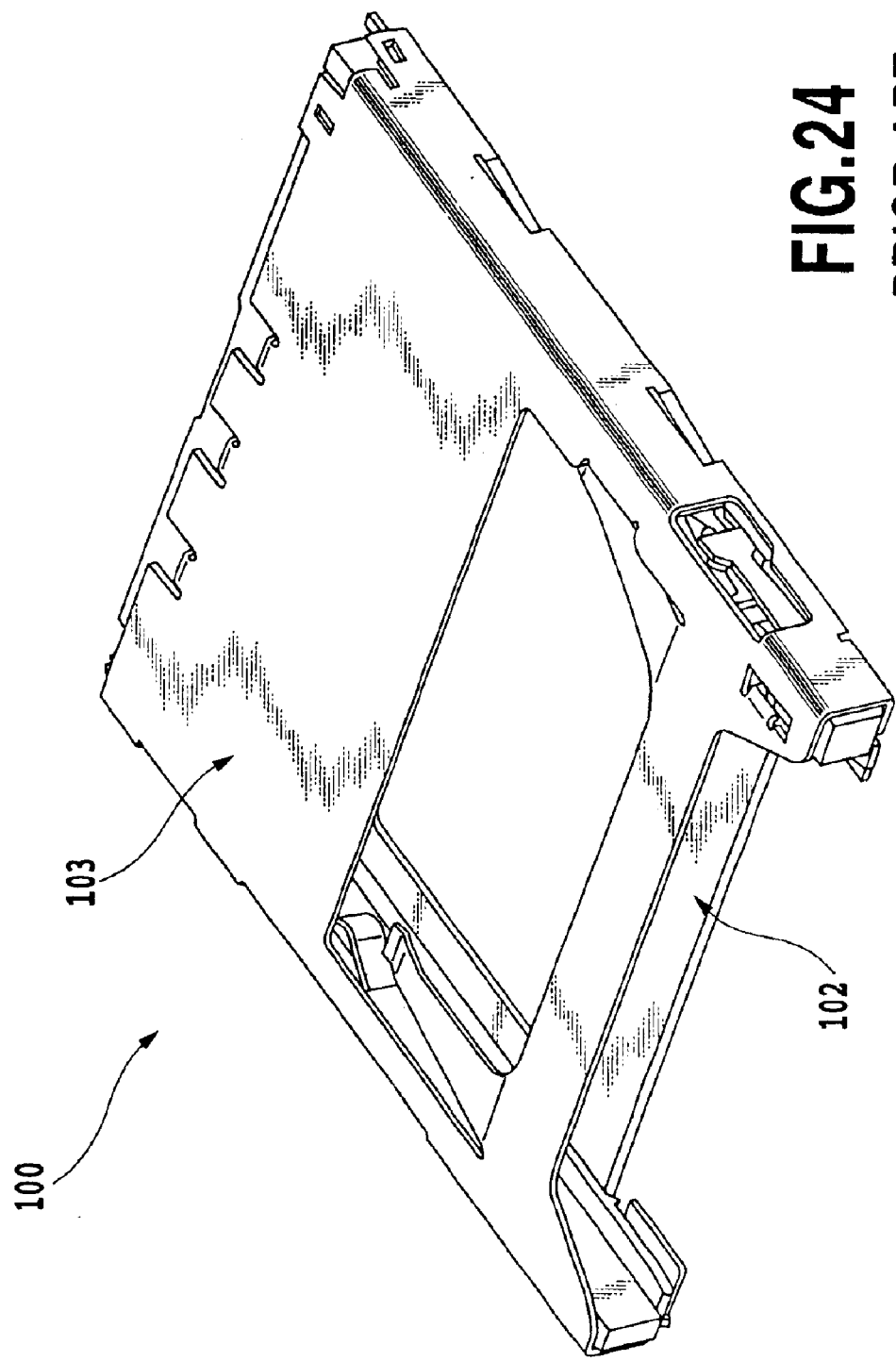
FIG. 24 is a perspective view of an appearance of the conventional card connector as a prior art.
Figure 25:
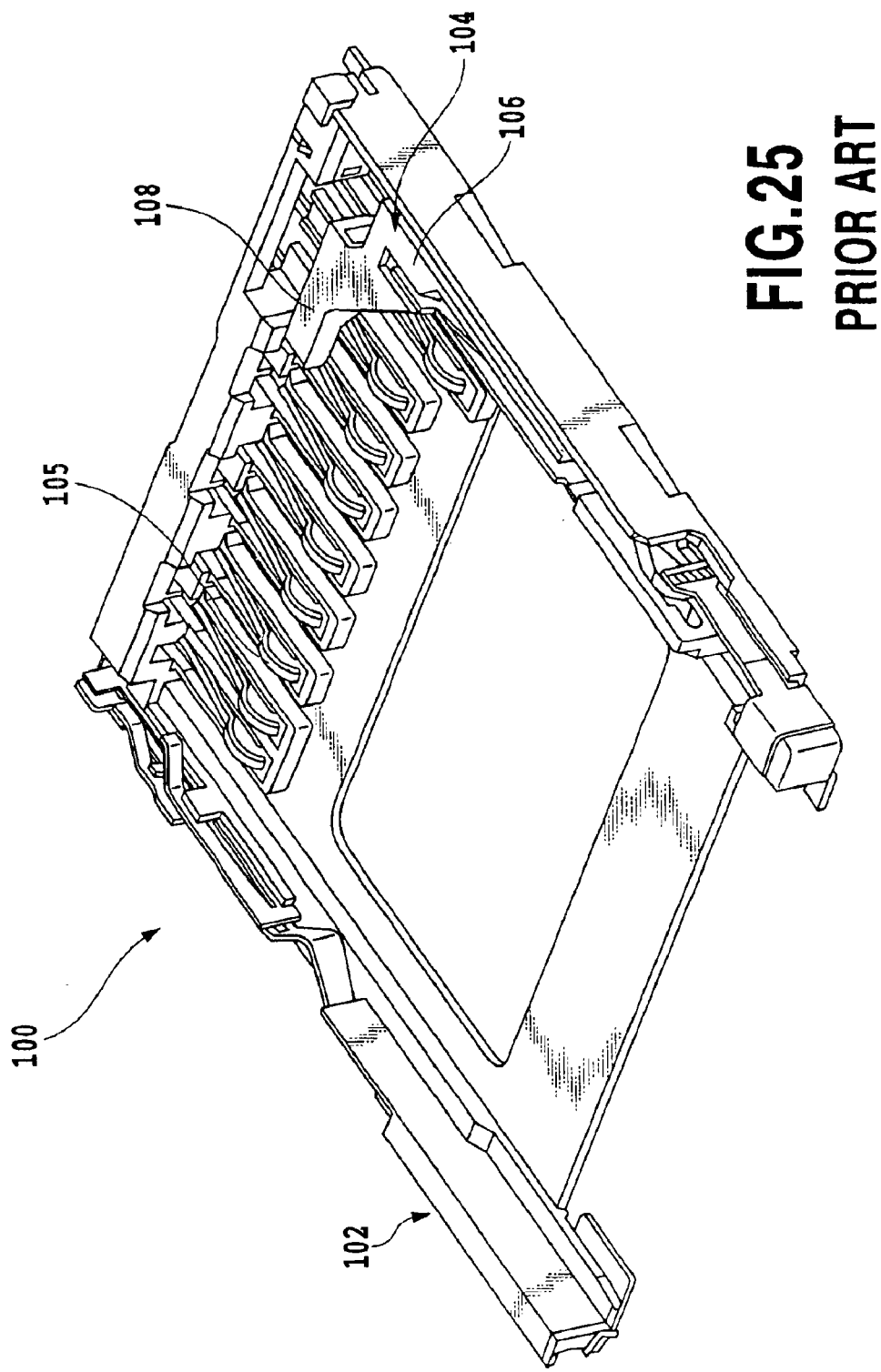
FIG. 25 is a perspective view of the card connector shown in FIG. 24 when the upper housing member which is a cover member is removed.
Figure 26:
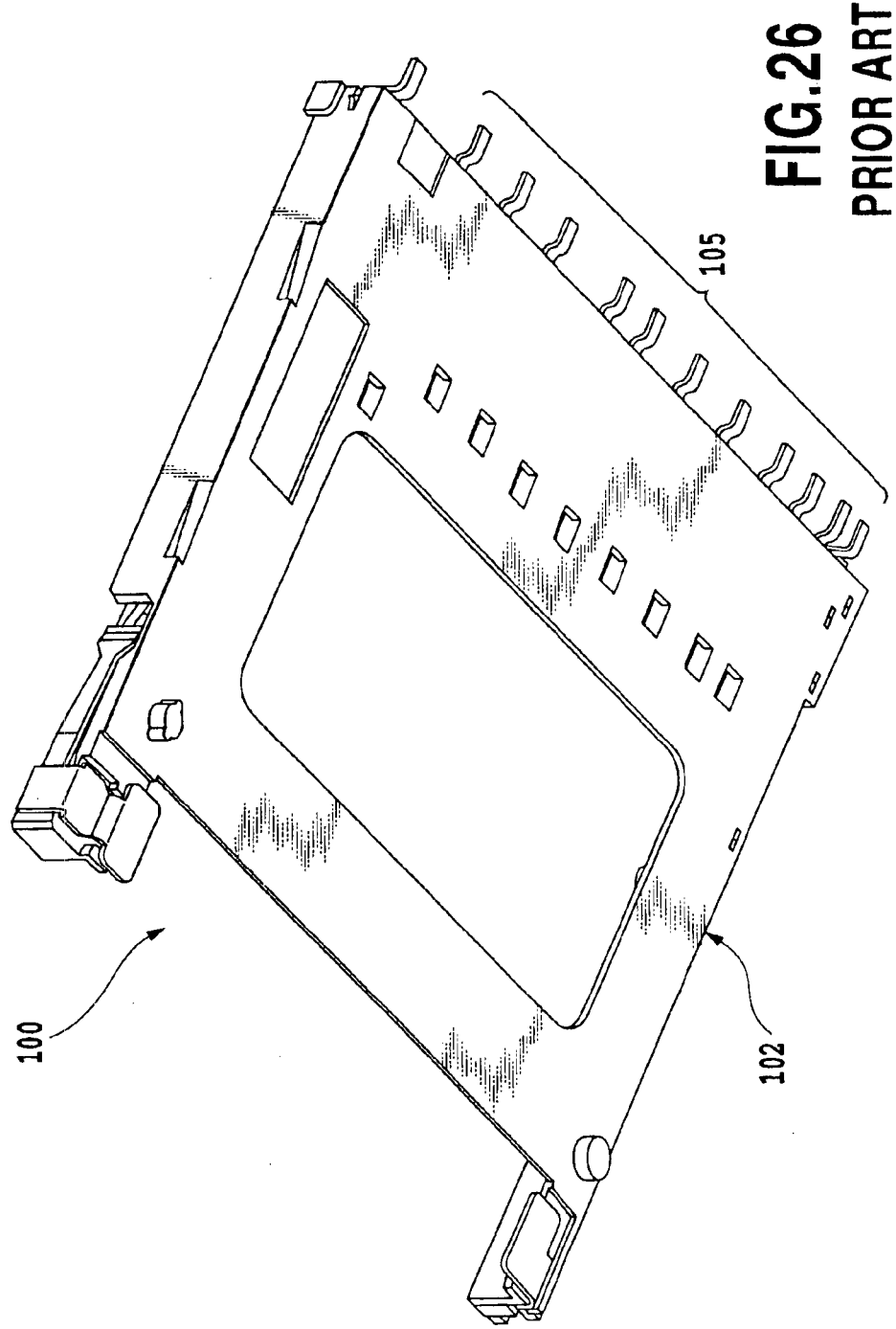
FIG. 26 is a bottom perspective view of the lower housing member as seen from the underside.
Figure 27:
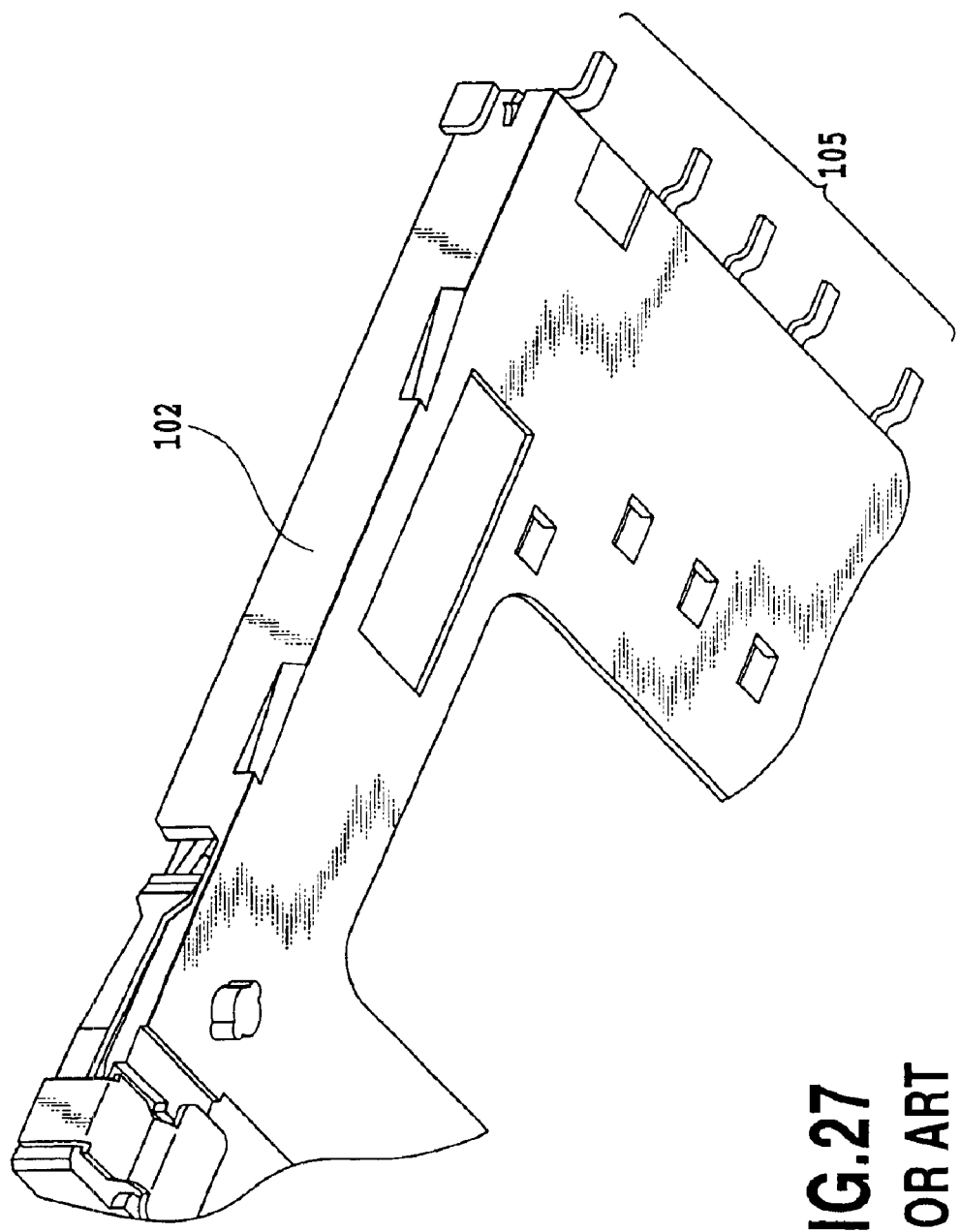
FIG. 27 is an enlarged partial bottom view of the lower housing member.
Figure 28:
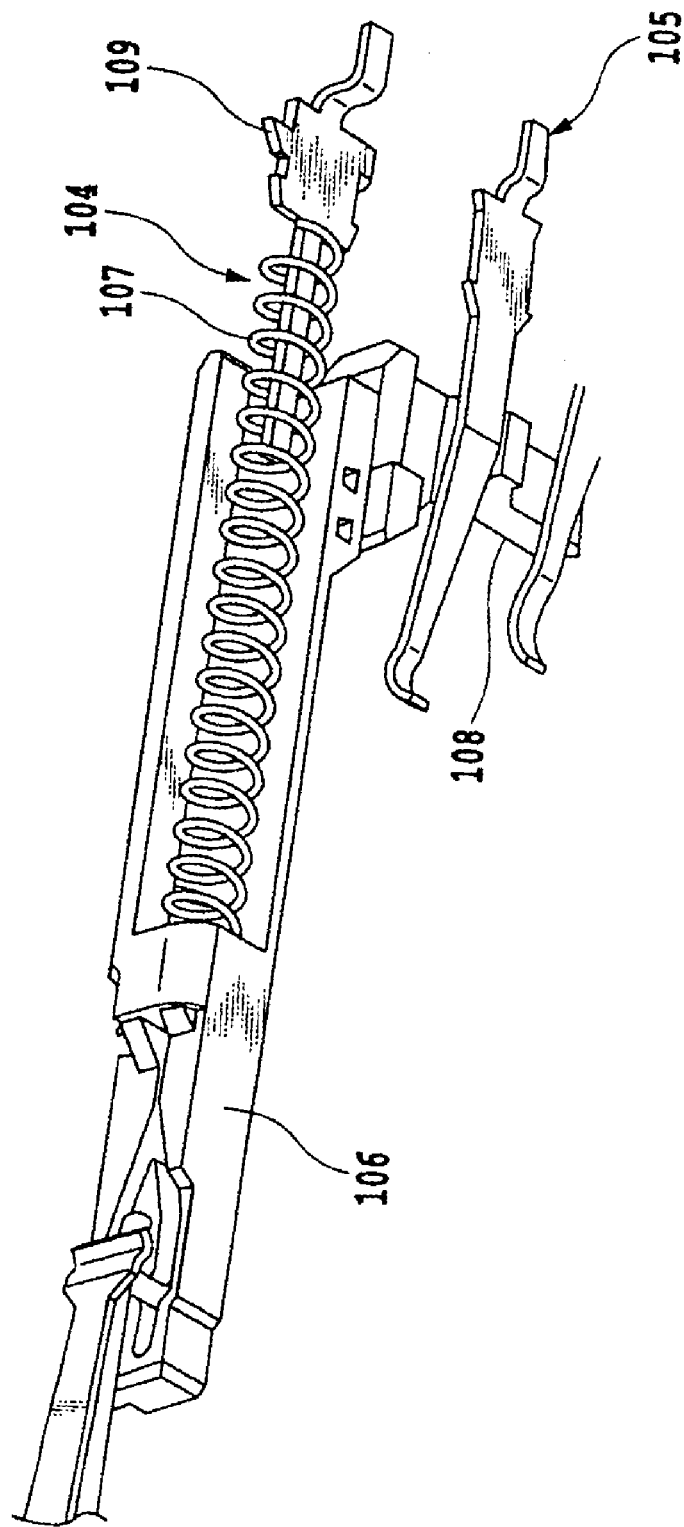
FIG. 28 is a bottom perspective view of an ejecting member.

Further, FIG. 11 is a perspective view of an appearance of the ejecting member in the card connector of the present invention; FIG. 12 is an enlarged partial view of a heart cam section of the ejecting member shown in FIG. 11; FIG. 13 is a side view of the heart cam of the ejecting member shown in FIG. 11; FIG. 14 is a side view of the ejecting member illustrating the steps of the operation of an end of the cam lever in the heart cam shown in FIG. 11; FIG. 15 is an enlarged partial view showing shoulders in the heart cam in FIG. 14; FIG. 16 is an enlarged partial view showing the movement in a first shoulder; FIG. 17 is a similar enlarged partial view showing the movement in a second shoulder; FIG. 18 is a similar enlarged partial view showing the movement in a fourth shoulder; FIG. 19 is an enlarged partial view showing the movement on a surface of the third shoulder; FIG. 20 is an enlarged partial view showing the movement when ascending an inclined surface; FIG. 21 is a perspective view of the ejecting member; FIG. 22 is a partial perspective view of a cross-section of the heart cam section of the ejecting member; and FIG. 23 is a side cross-sectional view of the heart cam section of the ejecting member.

As shown in FIGS. 1 to 10, the card connector 1 of the present invention is of a hollow flat housing shape constituted by a lower housing member 2 as a connector body and an upper housing member 3 as a cover member in combination with the lower housing member 2. This hollow housing shape of the card connector 1 of the present invention is open on one side to form a card-insert opening 6 and close on the other side by an end wall 14. On the upper surface of the lower housing member 2, a plurality of contacts 5 are arranged to be electrically connected to contact pads 22 of a card 20, and extend in close to the card-insert opening 6 of the card connector 1.

In this regard, the card connector 1 of this embodiment in the present invention is adapted to be used for the card 20 such as an SD card or a small-sized memory card. However, the present invention should not be limited to the exclusive use of such an SD card or a small-sized memory card, but may, of course, be suitably used for a similar memory card such as an IC card or a SIM card besides the SD card.

In the card connector 1 of the present invention, as shown in FIGS. 3, 5 and 8, the card 20 has a proper thickness and a slanted cut-off section 21 at one corner of a front edge. Also, a plurality of recesses 23 are provided in a front area of a lower surface of the card 20, and a contact pad 22 is provided in each of the recesses 23. These contact pads 22 have signal pins, respectively, for an electric source, command, data, clock or others. The card 20 is inserted into the card connector 1 of the present invention so that the contact pads 22 of the card 20 are underside.

As shown in FIGS. 1, 2 and 7 to 10, the card connector 1 of the present invention includes the lower housing member 2 as a connector body, the upper housing member 3 as a cover member, an ejecting mechanism 4 provided with a cam mechanism 7 for ejecting the card 20 and the plurality of contacts 5, and is used while being incorporating into various electronic instruments or information terminal equipments.

In the card connector of such a type of the present invention, the lower housing member 2 as a connector body is molded with an insulating material such as suitable synthetic resin. On the other hand, the upper housing member 3 is made as a cover member by the sheet metal processing such as blanking or press-working. Accordingly, the lower housing member 2 is combined with the upper housing member 3 to be a hollow flat shape having a card space in which the card 20 is to be inserted. The card 20 is accommodated in the card space.

As illustrated, the lower housing member 2 of the insulating material includes a lower plate section 11, left and right side walls 12, 13 and the end wall 14 on the closed side. Further, in the lower housing member 2, guide paths 15m 16 are provided along the left and right side walls 12, 13. The ejecting mechanism 4 is provided along one of the side walls 12, 13; in this embodiment, the side wall 13. Accordingly, by this ejecting mechanism 4, it is possible to smoothly insert and withdraw the card 20 relative to the card connector 1. In addition, grooves 17 are provided in the lower plate section 1 of the lower housing member 2, for positioning and fixing the plurality of contacts 5, respectively, by press-fitting the contacts 5 into the grooves 17.

The respective contact 5 is formed of a metallic strip as shown in FIG. 2, and includes a terminal section 24 to be soldered to a contact pad of a printed circuit board in the electronic instrument, a fixing section 25 formed by bending the terminal section 24 twice generally at a right angle to extend parallel thereto to be fixed to the groove 17 of the groove 17 in the lower plate section 11 of the lower housing member 2, for example, by the press-fitting, an elastic spring piece section 26 extending from the fixing section 25 in a cantilever manner to be elastically deformed, and a contact section 27 formed in an arcuate shape at a tip end of the elastic spring piece section 26. Such a contact 5 is disposed so that the terminal section 24 is located at the card-insert opening 6 and the contact section 27 is located closer to the end wall 14. Such the location of the contact 5 is one of factors for enabling the length of the inventive card connector 1 to be shorter and is capable of easily inserting the card 20 thereinto.

As shown in FIGS. 1 and 3, the upper housing member 3 is formed by bending a suitable metallic sheet by the press-working or others to have an upper plate 28 and left and right side plates 29, 30. Thus, the upper housing member 3 is disposed as a cover member on the lower housing member 2 to cover the latter. A window is formed in one of the side plates 30 of the upper housing member 3, and a cam lever presser 18 is provided therein.

The card connector 1 of the present invention of the above-mentioned type has a push-push type ejector mechanism 4 capable of ejecting or discharging the inserted card 20 by releasing the inserted card 20 after pushing the same a little toward the inside of the housing.

Such an ejecting mechanism 4 for ejecting the card 20 includes, for example, an ejecting member 8 as an operating member mounted to be slidable in an accommodation space 19 formed along one of the side walls 13 in the inside of the lower housing member 2 as a connector body, a spring member 9 such as a coil spring elastically deformable by being pushed by the ejecting member 8, a heart cam 40 formed in one of side walls of the ejector member 8, and a cam lever 10 cam-engageable with a cam groove 41 formed around the heart cam 40. In this regard, the cam mechanism 7 is constituted by the cam lever 10 in the ejecting mechanism 4 and the cam groove 41 formed around the heart cam 40.

The ejecting mechanism 4 of the present invention described above is adapted to push the ejecting member 8 by the elastic force stored in the spring member 9 and discharge or eject the card 20 outside by the ejecting member 8. Accordingly, in this ejecting mechanism 4, since the ejecting member 8 is provided for discharging the card 20, it is adapted to elastically push the ejecting member 8 by the spring member 9 of a compressive spring type, such as a coil spring.

Particularly, according to the present invention, the spring member 9 of such a type is engaged at one end to part of the end wall 14 of the lower housing member 3, and engaged at the other end with an engagement section 33 as an inner wall of a spring accommodation space 32 of a tunnel type formed in the ejecting member 8. And, it is adapted that the ejecting member 8 is made to stop by abutting to a boss 34 formed in the lower housing member 3. Accordingly, the boss 34 operates as a stopper, and the spring member 9 of a compressive spring type is compressed by the ejecting member 8 and elastically deformed.

A card abutting section 35 having a shape in correspondence to the cut-off section 21 of the card 20 is formed in the ejecting member 8, which extends inward generally in a right angle to the operating or sliding direction of the ejecting member 8 so that a tip end portion of the card 20 abuts thereto as well as the cut-off section 21 of the card 20 abuts and is engageable thereto. Accordingly, the ejecting member 8 having such a card abutting section 35 is capable of suitably being in contact and engaged with the card 20 to push and compress the spring member 8 via the ejecting member 8. Thus, the card 20 is ejected outside by the ejecting member 8.

Since the cut-off section 21 formed by chamfering one corner of the card 20 is suitably engageable with the card abutting section 35 at a connecting corner of the ejecting member 8, it is operable as means for preventing the card 20 from being erroneously inserted in reverse.

According to the card connector 1 of the present invention of the above-mentioned type, the card connector 1 of a hollow flat housing shape is formed by the lower housing member 2 as a connector body and the upper housing member 3 as a cover member combined with the lower housing member 2, and the card discharging ejecting mechanism 4 having the spring member 9 is provided therein. Further, one end of the spring member 9 in the ejecting mechanism 4 is engaged to the end wall 14 of the lower housing member 2 and the other end thereof is engaged with the engagement section 33 of the spring accommodation space 32 formed in the ejecting member 8. Accordingly, since the ejecting member 8 is made to stop by abutting to the boss 34 formed in the lower housing member 2, it is possible to manufacture the flat and thin card connector 1 low in height suitably used for various electronic instruments or information terminal equipments such as a portable telephone. Thereby, the card 20 is inserted into the card connector 1 while disposing the contact pads 22 underside.

FIGS. 11 to 14 illustrate the heart cam 40 formed on one side of the ejecting member 8 in the ejecting mechanism 4 of the card connector 1 of the present invention by perspective views and side views showing a side wall of the ejecting member 8 in the ejecting mechanism 4 of the card connector 1 of the present invention.

The illustrated card connector 1 of the present invention is of a push-push type as described above, capable of inserting/discharging the card 20 such as an SD card or a small-sized memory card. Accordingly, when the card 20 inserted in the card connector 1 is withdrawn, the card 20 must be pushed further inward a little and then is ejected outside. Such a type of the card connector is referred to as a push-push type.

Thus, in the card connector 1 of the present invention, the heart cam 40 is provided in one of the side walls of the ejecting member 8 in the ejecting mechanism 4, and the loop-like cam groove 41 is formed around the heart cam 40, along which an end 38 of the cam lever 10 is cam-engaged and operated as a cam follower. For inserting and discharging the card 20 by the cam operation of the end 38 of the cam lever 10 as a cam follower, the cam groove 41 is formed in a loop shape. Further, to prevent the end 38 of the cam lever 10 from moving in the counter direction, shoulders A, B, C, and D, are provided at suitable positions on the bottom surface of the cam groove 41.

As illustrated, in the card connector 1 of the present invention, the laterally disposed heart cam 40 which is one element of the cam mechanism is provided on the side wall of the ejecting member 8, and an upper guide groove 42 and a lower guide groove 43 for forming the guide groove 41 are provided around the heart cam 40. The upper and lower guide grooves 42 and 43 are joined together at a tapered tip end of the heart cam 40 and further extend forward to define a linear guide groove 48.

Two short guide grooves 44, 45 generally parallel to each other for starting the card-ejection are provided close to a recess 46 formed in a head of the heart cam 40 and extend in the lateral direction like horns. Root portions of the card-ejection starting guide grooves 44, 45 are communicated with each other upward and downward in the recess 46 in the head of the heart cam 40. At a center of the recess 46, a cam lever engagement section 47 is provided for maintaining the cam lever 10 in a fixed state. Further, on the bottom surface of the cam groove 41, shoulders A, B, C and D are provided to prevent the reverse movement of the end 38 of the cam lever 10.

In correspondence to the heart cam 40 of the ejecting member 8 in the present invention, the cam lever 10 is provided to be cam-engageable therewith. That is, both ends of the cam lever 10 are bent generally at a right angle to be a flat U-shape. One end 37 is supported for rotation in a hole (not shown) of the lower housing member 2, while the other end 38 is engaged with the cam groove 41 around the heart cam 40 to operate as a cam follower. Accordingly, the cam lever 10 is subjected to the following motion, in which the one end 37 operates as a fulcrum to move the other end 38 along the cam groove 41.

The cam groove 41 is of a generally loop shape including the upper guide groove 42, the lower guide groove 43, the pair of card-ejection starting guide grooves 44, 45, the recess groove 46, the cam lever engagement section 47 and the linear guide groove 48. Accordingly, the one end 37 of the cam lever 10 is supported for rotation by the lower housing member 2, while the other end 38 is cam-engaged with the cam groove 41 having the upper guide groove 42, the lower guide groove 43 or others.

Thereby, the cam lever 10 is fixed at the end 37 to the lower housing member 2, and the ejecting member 8 having the cam groove 41 cam-engaged with the end 38 of the cam lever 10 is movable. The cam mechanism 7 is formed by the cam lever 10 and the cam groove 41 having the upper guide groove 42, the lower guide groove 43 or others provided around the heart cam 40.

Further, the shoulders A, B, C and D are provided at suitable positions on the bottom surface of the cam groove 41 for limiting the movement of the end 38 of the cam lever 10 in one direction relative to the cam groove 41 around the heart cam 40 and preventing it from moving in the reverse direction.

As shown in FIGS. 13 and 14, the first shoulder A is provided at an exit of the lower guide groove 43 so that the lower guide groove 43 is higher than the card-ejection starting guide groove 45.

The second shoulder B is provided at an exit of the lower card-ejection starting guide groove 45 generally corresponding to a center of the recess 46 communicating the upper guide groove 42 with the lower guide groove 43 so that the lower card-ejection starting guide groove 45 is higher.

The third shoulder C is provided at an entrance of the upper card-ejection starting guide groove 44 corresponding to the upper exit of the recess 46 so that the cam lever engagement section 47 is higher than the upper card-ejection starting guide groove 44.

On the slanted surface of the heart cam 40 along the upper guide groove 42 of the cam groove 41, an ascending slope E formed to be projected outward is provided in correspondence to a tip end surface of the end 38 of the cam lever 10.

The fourth shoulder D is provided at a junction between the upper guide groove 42 and the lower guide groove 43 corresponding to one of the side walls of the lower guide groove 43 so that the upper guide groove 42 is higher than the lower guide groove 43.

Thus, in the cam groove 41 having such shoulders A, B, C and D, the end 38 of the cam lever 10 is movable to form a loop along the cam groove 41 as shown by arrows in FIG. 14 (in the clockwise direction) as described in more detail hereinafter, while inhibiting the reverse movement in the counterclockwise direction by the shoulders A, B, C and D.

In the ejecting mechanism 4 according to the present invention of the above structure, the following cam operation is carried out by the ejecting member 8 and the cam lever 10 when the card 20 is inserted.

First, in the card connector 1, into which the card 20 has not yet been inserted to maintain a free state, the end 38 of the cam lever 10 is located in the linear guide groove 48 as shown in FIG. 14. If the card 20 is inserted into the card connector 1 in this state, the ejecting member 8 is pushed by the card 20 and moves into the card connector 1.

Accordingly, the end 38 of the cam lever 10 moves leftward in the linear guide groove 48 in the direction indicated by arrows in FIG. 14 and is transferred from the linear guide groove 48 to the lower guide groove 43. At this time, the advancement of the end 38 of the cam lever 10 into the upper guide groove 42 is inhibited by the shoulder D described above and guided along the shoulder D into the lower guide groove 43. Thus, the end 38 of the cam lever 10 is guided from the linear guide groove 48 to the lower guide groove 43 by the shoulder D, moves along the lower guide groove 43 provided in the lower loop of the heart cam 40, and enters the card-ejection starting guide groove 45 while clearing the shoulder A.

At this time, the card 20 is pushed deepest in the card connector 1, and the spring member 9 is compressed to the maximum limit by the ejecting member 8, at which the end 38 of the cam lever 10 is located at the closed end of the card-ejection starting guide groove 45. At this point, the person inserting the card 20 stops pushing the card into the card connector 1, and releases the card 20. After it is released, the card 20 is stably maintained at this position, because the end 38 of the cam lever 10 enters the recess 46 from the lower card-ejection starting guide groove 45 since the ejecting member 8 is pushed by the spring member 9, and is made to stop by abutting to the cam lever engagement section 47 of the cam groove 41 of the heart cam 40 while clearing the shoulder B. In this position, the card-inserted state, various kinds of contacts 5 are suitably in contact with the corresponding contact pads 22 of the card 20 to maintain the predetermined electric connection. As a result, the insertion of the card has been completed and the card 20 is mounted to the card connector 1.

Next, to withdraw the card 20 from such a card-inserted state, a person wishing to remove the card lightly pushes the card 20 once into the card connector 1. This light push moves the end 38 of the cam lever 10 from the cam lever engagement section 47 in the recess 46 of the heart cam 40 into the upper card-ejection starting guide groove 44 while clearing the shoulder C.

Since the ejecting member 8 becomes free by being released from the locked state caused by the cam lever 10, the ejecting member 8 is pushed by the pressure of the spring member 9 in the discharging direction, and the end 38 of the cam lever 10 moves from the upper card-ejection starting guide groove 44 to the upper guide groove 42 while being inhibited from entering the recess 46 by the shoulder C. Thus, the end 38 of the cam lever 10 moves in the upper guide groove 42 along the circumference of the heart cam 40 in the direction shown by arrows, clears the ascending slope E, passes the shoulder D and moves into the linear guide groove 48 via the junction with the lower guide groove 43. In such a manner, the card 20 is ejected from the card connector 1 by the ejecting member 8, and the ejecting member 8 is made to stop by abutting to the boss 34 of the lower housing member 2.

In this regard, while the above explanation has been made as if the end 38 of the cam lever 10 moves relative to the cam groove 41 of the ejecting member 8 shown by arrows in FIG. 14, in fact, the cam lever 10 is stationary and the ejecting member 8 is movable in reciprocation leftward/rightward and the movement of the upper guide groove 42 or the lower guide groove 43 of the cam groove 41 relative to the end 38 of the cam lever 10 is shown by arrows. This is also true to the following description.

As described above, according to the card connector 1 of the present invention, the end 38 of the cam lever 10 moves in the cam groove 41 formed around the heart cam 40 shown in FIG. 15, and the shoulders A, B, C and D are provided for inhibiting the reverse movement of the cam groove 41 in the ejecting member 8 relative to the end 38 of the cam lever 10 during this movement. Positions of the end 38 of the cam lever 10 when it passes the shoulders A, B, C and D and the ascending slope E are illustrated in FIGS. 16 to 20, respectively.

FIG. 16 shows when the end 38 of the cam lever 10 is located at the first shoulder A in FIG. 15; FIG. 17 shows when the end 38 entered in the lower card-ejection starting guide groove 45 exits again therefrom to be located at the second shoulder B at the entrance. FIG. 18 illustrates the end 38 located in the cam lever engagement section 47 in the recess 46 of the heart cam 40 having the third shoulder C, and FIG. 19 illustrates the end 38 located at the entrance of the upper card-ejection starting guide groove 44. Further, FIG. 20 illustrates the end 38 located at a position immediately before the upper guide groove 42, from which the end 38 ascends the ascending slope E of the bottom surface of the upper guide groove 42, descends the upper slope of the cam groove 41 of the heart cam 40, clears the fourth shoulder D at the junction between the upper guide groove 42 and the lower guide groove 43, enters the linear guide groove 48, and is made to stop within this linear guide groove 48.

The movement of the end 38 of the cam lever 10 along the loop-like cam groove 41 is carried out while inhibiting shoulders A, B, C and D inhibit reverse movement (in the counterclockwise direction), so that the end 38 of the cam lever 10 correctly moves along the cam groove 41 in the direction shown by arrows in the drawings.

When the push-push operation is carried out for withdrawing the card 20 from the upper guide groove 42 or the lower guide groove 43 of the cam groove 41 formed around the heart cam 40, the inserted card 20 is once pushed a little. This pushing operation causes the end 38 of the cam lever 10 to move from the cam lever engagement section 47 to the upper card-ejection starting guide groove 44 (FIG. 20). When the end 38 of the cam lever 10 is released from the cam lever engagement section 47, the ejecting member 8 is free from the constraint of the cam lever 10 and pushed by the spring member 9 so that the upper guide groove 42 slides while being in contact with the end 38 of the cam lever 10. Thus, the end 38 of the cam lever 10 is located in the linear guide groove 48 via the junction in the cam groove 41, and the card 20 is smoothly discharged by the ejecting member 8.

The cam mechanism 7 constituted by the cam lever 10 and the heart cam 40 according to the present invention has a cam lever presser 18 for pressing the end 38 of the cam lever 10 so that the cam lever 10 is prevented from coming off and the end 38 of cam lever 10 is smoothly slidable. The cam lever presser 18 is formed of a generally L-shaped metallic strip and a base end portion 50 thereof is press-fit in a groove 49 formed on a side of the lower housing member 2 to be supported in a cantilever manner.

A tip end portion 51 of the cam lever presser 18 is of an arcuate shape projected toward the cam lever 10, and supported to be elastically deformable by using the base end portion 50 as a fulcrum. Since the cam lever presser 18 elastically deforms as the ejecting member 8 moves, a window 31 for allowing this elastic deformation is formed in a side plate 30 of the upper housing member 3.

FIGS. 21 to 23 illustrate the cam groove 41 around the heart cam 40 and a wall thickness of the spring accommodation space 32 for accommodating one end of the spring member 9 in the inventive card connector 1. As illustrated, the deepest upper guide groove 42 in the ejecting member 8 is provided in an upper portion of the side wall of the ejecting member 8 having the maximum wall thickness. Accordingly, it is possible to ensure the necessary minimum wall thickness t between the spring accommodation space 32 and the side wall.

Figure 29:
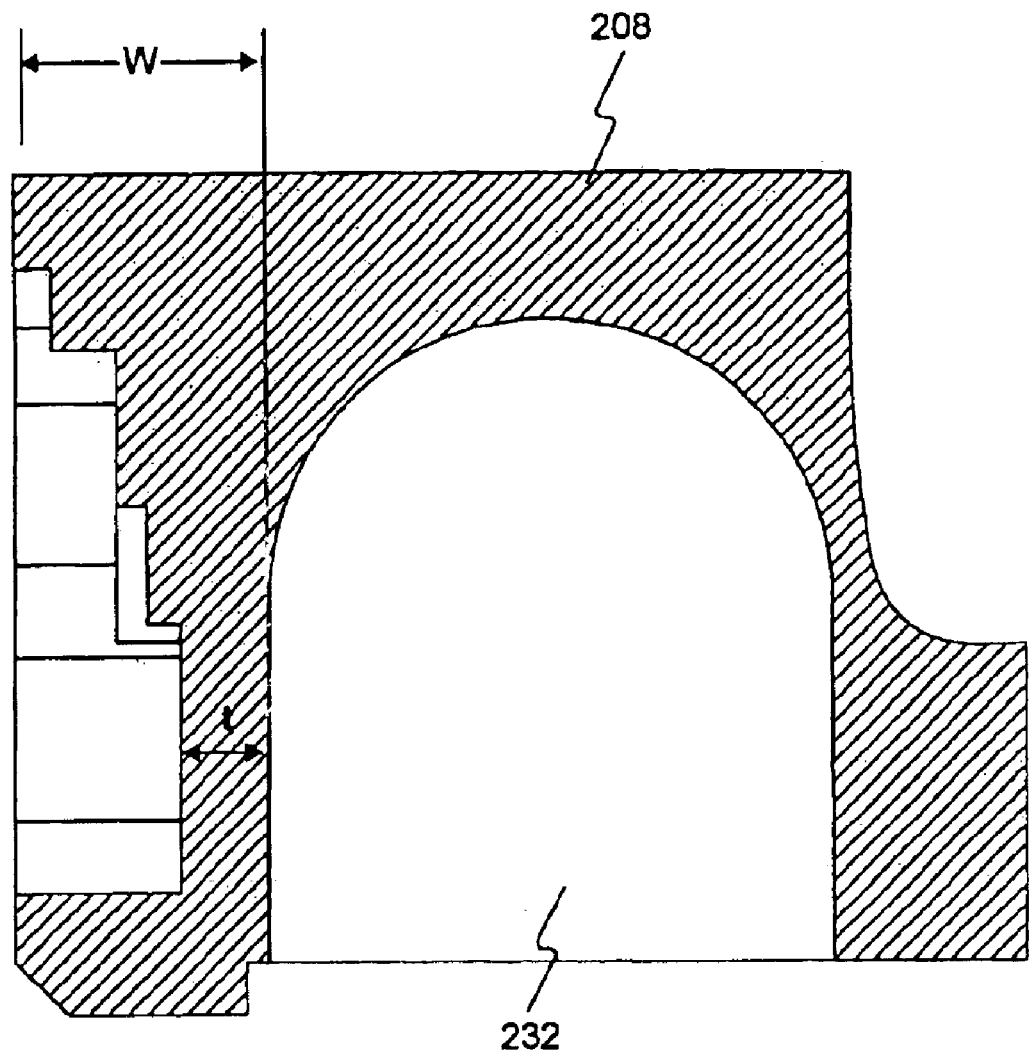
FIG. 29 is a side cross-sectional view of part of an ejecting member in another possible embodiment of the card connector of the present invention.

Thus, the card connector 1 of the above-described embodiment of the present invention is capable of reducing the widthwise thickness of the spring accommodation space 32 in the ejecting member 8 by thickness s. As a result, the widthwise thickness W of the spring accommodation space 32 in the card connector 1 of the present invention is narrower than the widthwise thickness w of the spring accommodation space 232, as shown in FIG. 29. This means that it is possible to reduce a total width of the card connector 1 of the present invention by thickness s to be small in size as a whole.

As described above, according to the card connector 1 of the present invention, the heart cam 40 is provided in one side wall of the reciprocating ejecting member 8, and the cam groove 41 formed around the heart cam 40. The shoulders A to D are provided in the cam groove 41 for inhibiting the reverse movement of the end 38 of the cam lever 10 selectively moving therein. The final surface of the shoulder C which is deepest is formed in the resinous material portion of the ejecting member 8 corresponding to the upper portion of the spring accommodation space 32 in the ejecting member 8 as a groove surface of the upper guide groove 42. Thereby, it is possible to reduce the widthwise dimension of the ejecting member 8, and also to reduce a total width of the card connector 1, resulting in the miniaturization of the card connector 1.

Also, according to the present invention, since the heart cam 40 is provided in the side wall of the ejecting member 8 to shorten the length of the ejecting member 8, the length of the card connector 1 itself can be shortened.

As described hereinabove, the card connector of the present invention has a hollow housing shape formed by combining two housing members with each other and an ejecting mechanism for ejecting a card, wherein the ejecting mechanism comprises an ejecting member for ejecting the card and a spring member for elastically biasing the ejecting member, and a cam having a loop-like cam groove around the cam is provided in a side wall of the ejecting member; one end of the a cam lever being held by one of the housing members and the other end of the cam lever being slidable along the cam groove formed around the cam. Therefore, it is possible to reduce the width of the card connector as well as shorten the length of ejecting member. This results in the reduction of a total length of the card connector and the miniaturization of a size thereof.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A card connector of a hollow housing shape comprising a first housing member, a second housing member, and an ejecting mechanism for ejecting a card, wherein the ejecting mechanism comprises an ejecting member for ejecting the card, a spring member for elastically biasing the ejecting member, a cam provided in a side wall of the ejecting member, a loop-like cam groove formed around the cam, and a spring accommodation space formed within said ejecting member, the spring accommodation space sharing a wall with the cam groove along a length of the spring member;

a first end of a cam lever is held by one of the first and second housing members and a second end of the cam lever slides along the cam groove formed around the cam.

2. A card connector as defined by claim 1, wherein the cam is of a generally heart shape.

3. A card connector as defined by claim 1, wherein the cam lever is bent at opposite ends thereof generally at a right angle.

4. A card connector as claimed in claim 1, wherein shoulders are provided within the cam groove to prevent the second end of the cam lever from moving around the cam in one direction.

5. A card connector as defined by claim 1, wherein the first housing member is a connector body comprising a lower housing member made of an insulating synthetic resin, and the second housing member is a cover member comprising an upper housing member formed of a metallic sheet.

6. A card connector as defined by claim 1, wherein the hollow housing shape is opened on one side to form a card-inserting opening and closed on another side by an end wall.

7. A card connector as defined by claim 1, wherein the ejecting member of the ejecting mechanism has a card-abutting section to contact a cut-off corner of the card; the cam, the cam groove comprising upper and lower guide grooves encircling the cam, and a cam lever engagement section in a recess of the heart cam are provided in one side wall of the ejecting member; and a pair of card-ejection starting guide grooves branch out of the cam lever engagement section.

8. A card connector as defined by claim 4, wherein the shoulders in the cam groove are provided at an exit of the lower guide groove, at an entrance and an exit of the upper guide groove, and a junction between the upper and lower guide grooves, respectively.

9. A card connector as defined by claim 1, wherein the spring accommodation space has a semicircular portion and the cam groove has a depth, which increases as a width of the spring accommodation space decreases.

10. A card connector as defined by claim 3, wherein the second end of the cam lever is engaged with the lower housing member, and the first end of the cam lever is engaged with the cam groove of the ejecting member.

11. A card connector as defined by claim 7, wherein the upper and lower guide grooves are joined together at a tapered tip end of the heart cam to define a single linear guide groove.

12. A card connector as defined by claim 1, wherein the spring member of the ejecting mechanism is a compressive spring.

13. A card connector as defined by claim 12, wherein the compressive spring is compressed by being pushed by the ejecting member of the ejecting mechanism.

14. A card connector as defined by claim 13, wherein one end of the compressive spring is engaged with the end wall of the lower housing member and the other end thereof is engaged with a spring accommodation space of the ejecting member.

15. A card connector as defined by claim 1, wherein a boss is provided in the lower housing member to abut with the ejecting member.

* * * * *